United States Patent

Suzuki et al.

[11] 4,313,622
[45] Feb. 2, 1982

[54] PASSIVE SEATBELT SYSTEM

[75] Inventors: Ichiro Suzuki; Hisashi Ogawa; Masanao Motonami, all of Aichi, Japan

[73] Assignee: Toyota Jidosha Kogyo Kabushiki Kaisha, Aichi, Japan

[21] Appl. No.: 17,941

[22] Filed: Mar. 6, 1979

[30] Foreign Application Priority Data

Aug. 16, 1978 [JP] Japan .................................. 53-112183

[51] Int. Cl.³ .............................................. B60R 21/02
[52] U.S. Cl. ........................................ 280/804; 74/29; 16/96 R; 297/469
[58] Field of Search ................ 280/804, 802, 801, 808; 297/482, 483, 469; 16/95 R, 96 R, 91; 74/30, 29

[56] References Cited
U.S. PATENT DOCUMENTS

| | | | |
|---|---|---|---|
| 2,671,285 | 3/1954 | Benschoten | 74/29 |
| 3,074,356 | 1/1963 | Parker | 16/95 R |
| 3,833,239 | 9/1974 | Coenen | 280/804 |
| 3,842,929 | 10/1974 | Wada | 280/804 |
| 3,874,244 | 4/1975 | Rausmussen | 74/30 |
| 3,882,955 | 5/1975 | Kaneko | 280/804 |
| 3,889,971 | 6/1975 | Kazaoka | 280/804 |
| 3,968,978 | 7/1976 | Hayashi | 280/804 |
| 4,039,224 | 8/1977 | Bauer | 280/804 |
| 4,061,365 | 12/1977 | Nagano | 280/804 |
| 4,174,865 | 11/1979 | Doveinis | 296/146 |

FOREIGN PATENT DOCUMENTS 2445688  4/1976  Fed. Rep. of Germany ...... 280/804

Primary Examiner—John P. Silverstrim
Attorney, Agent, or Firm—Koda and Androlia

[57] ABSTRACT

A passive seatbelt system for a vehicle including a tape having a plurality of holes formed therein at regular intervals, a passenger restraining seatbelt coupled at one end to the thick tape, a sprocket wheel which is engaged with the holes in the thick tape and a motor means which is coupled to a power source of the motor vehicle for driving the sprocket wheel. With such a system, the sprocket wheel causes the thick tape to move back and forth to thereby cause the seatbelt to move back and forth along the length of the vehicle. In this way, the seatbelt is automatically fastened or unfastened from the passenger.

27 Claims, 31 Drawing Figures

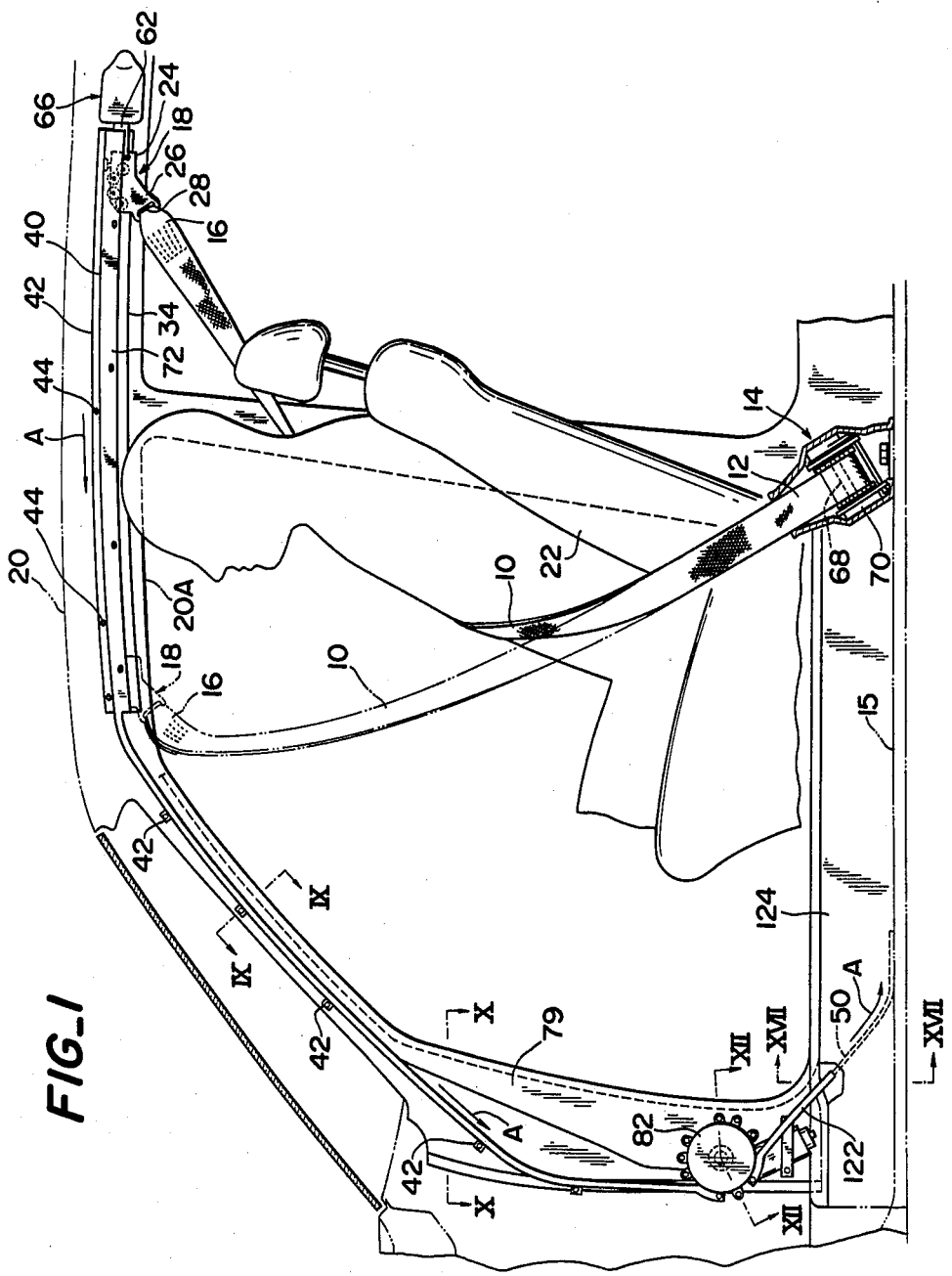

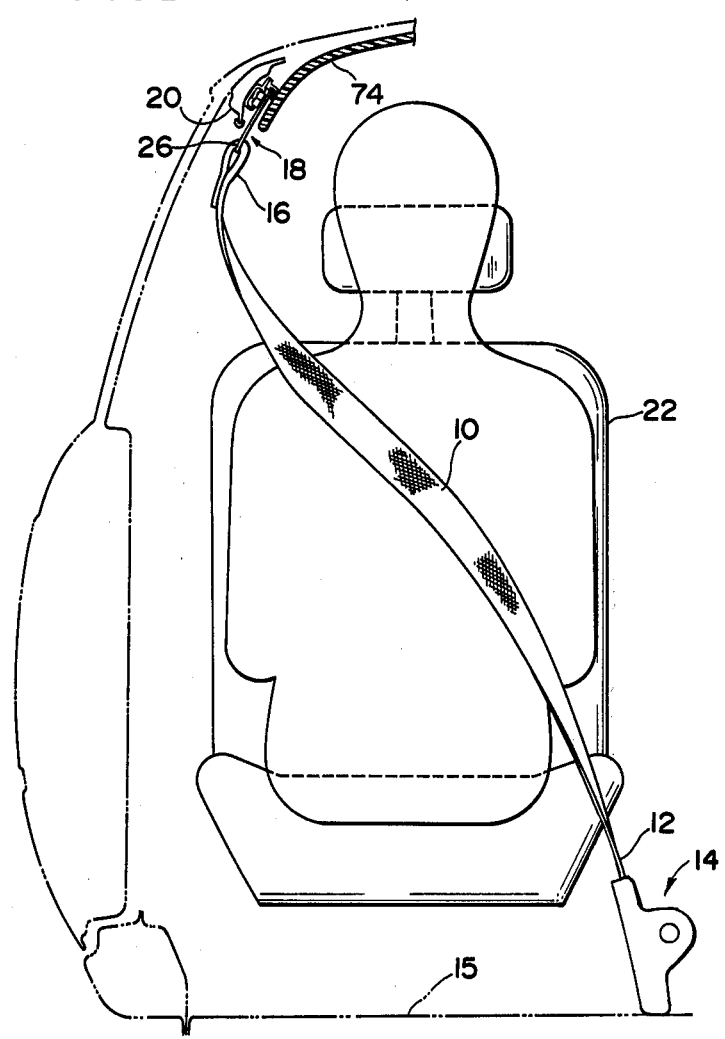

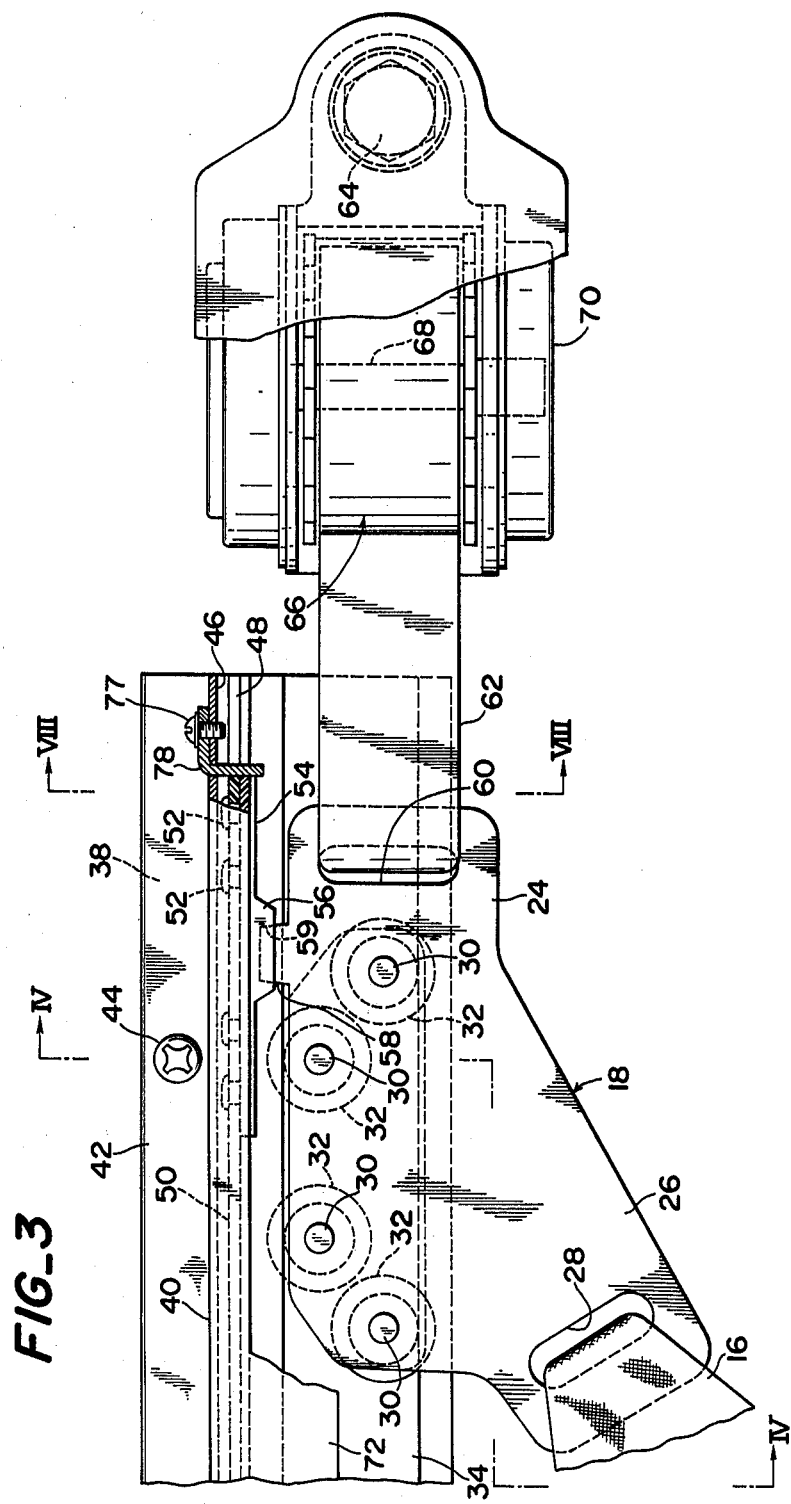

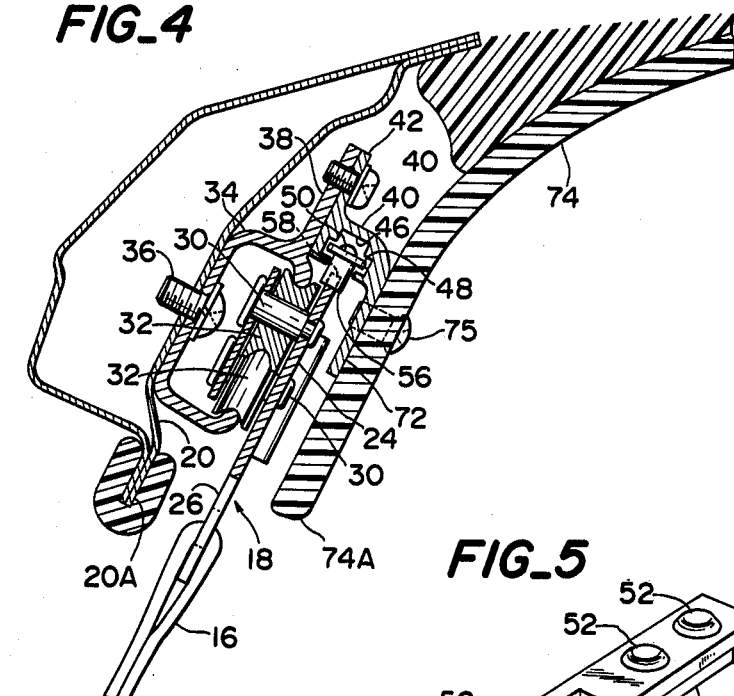
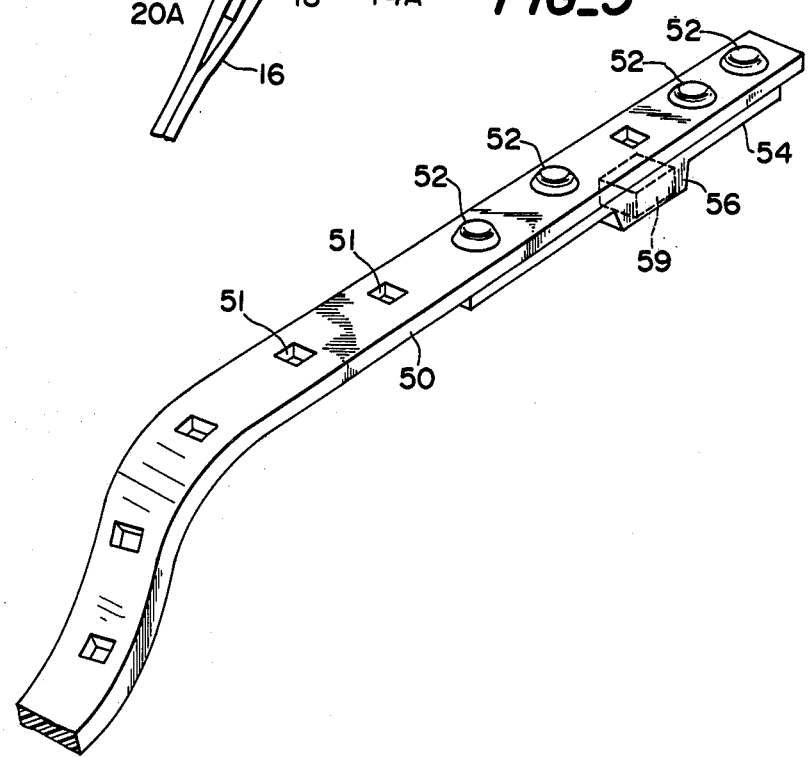

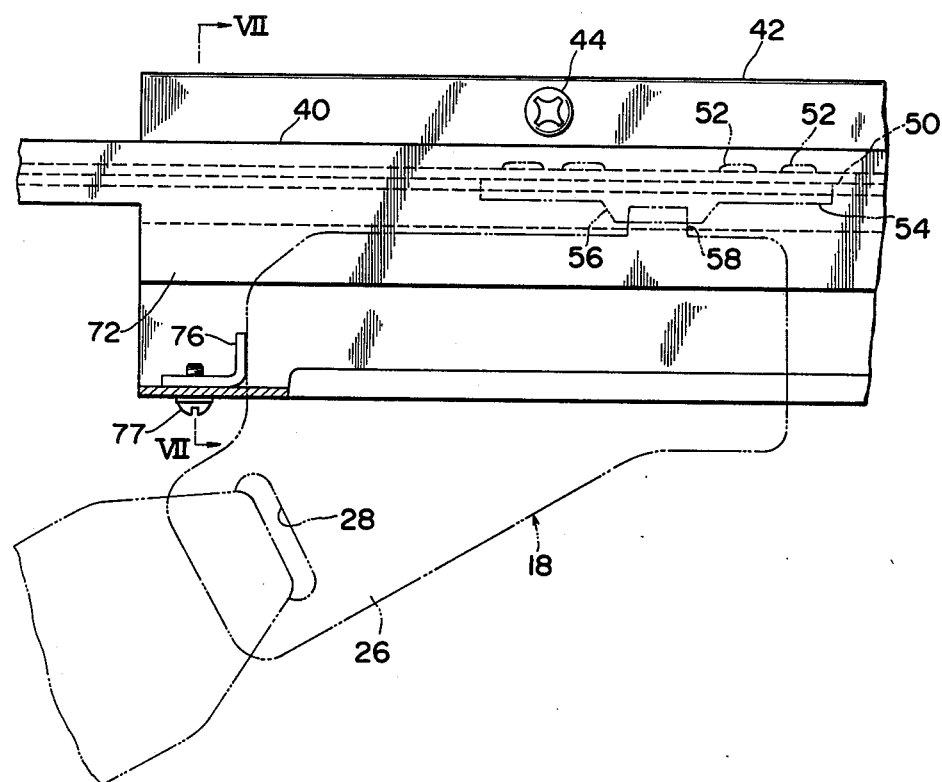
FIG_6
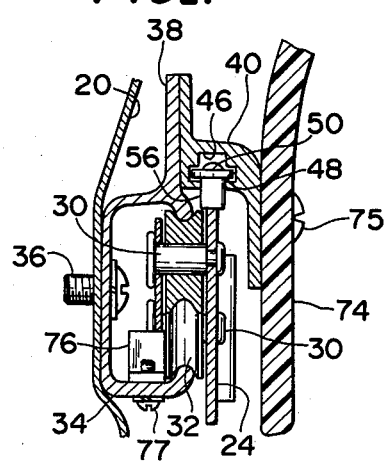
FIG_7
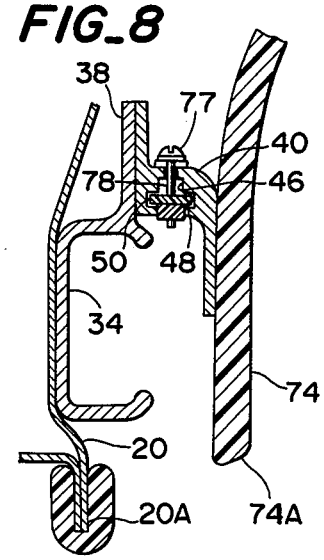
FIG_8

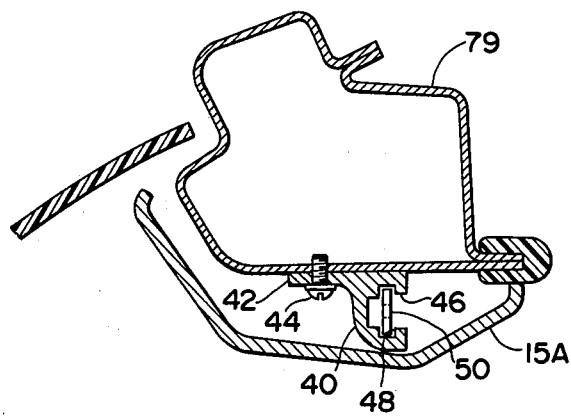
FIG_9
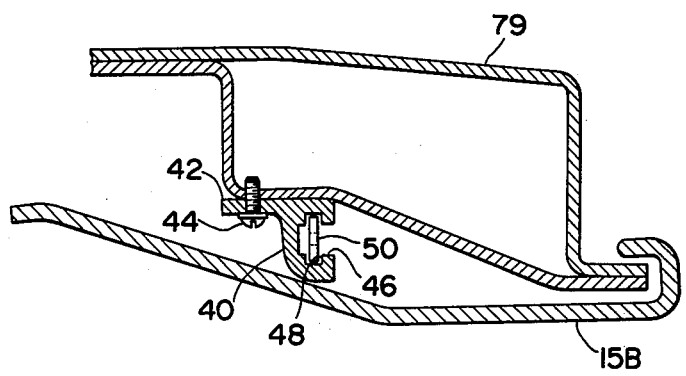
FIG_10

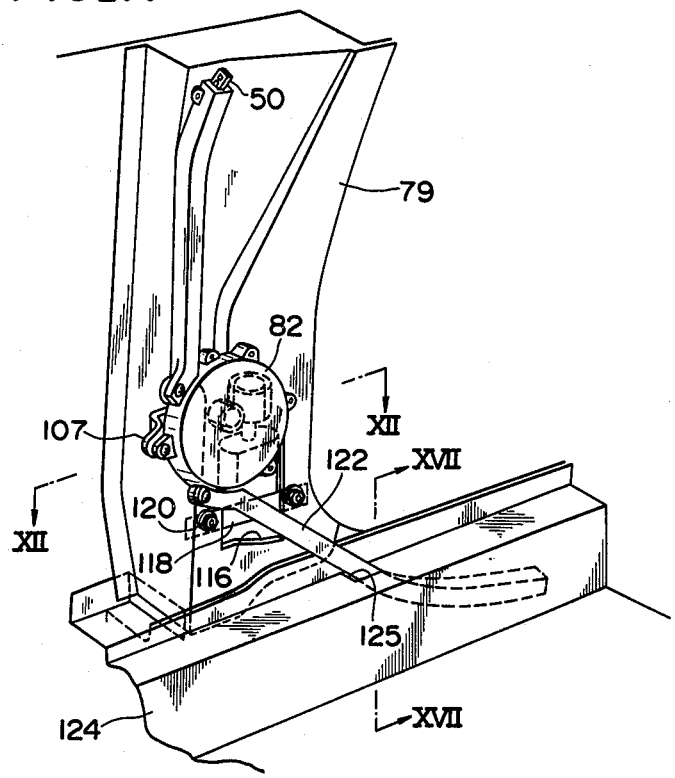
FIG_11
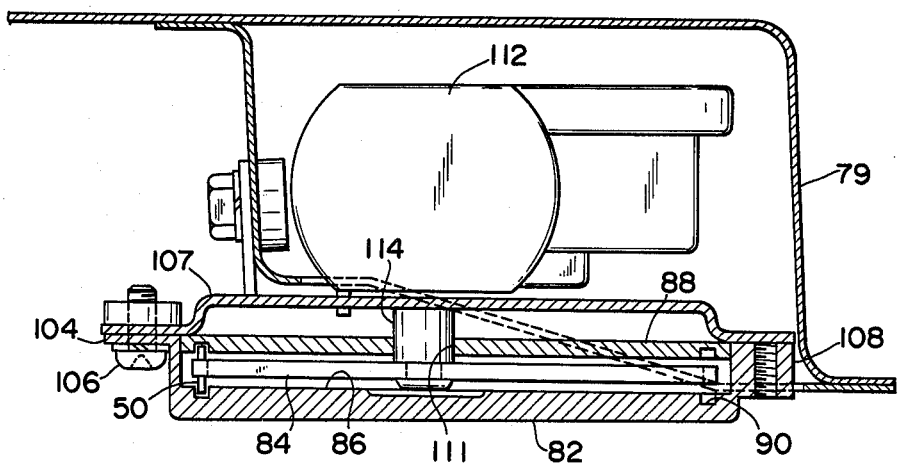
FIG_12

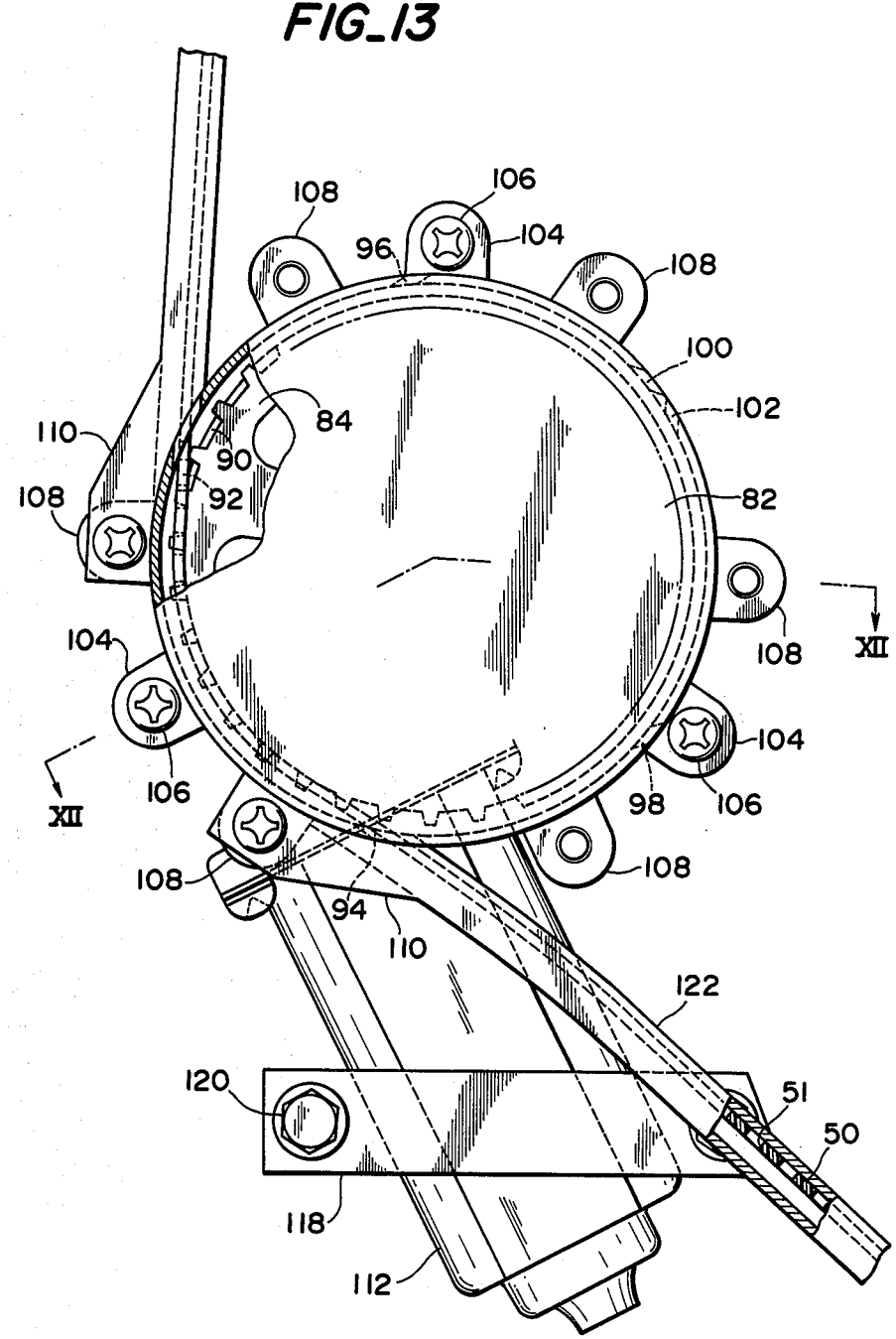

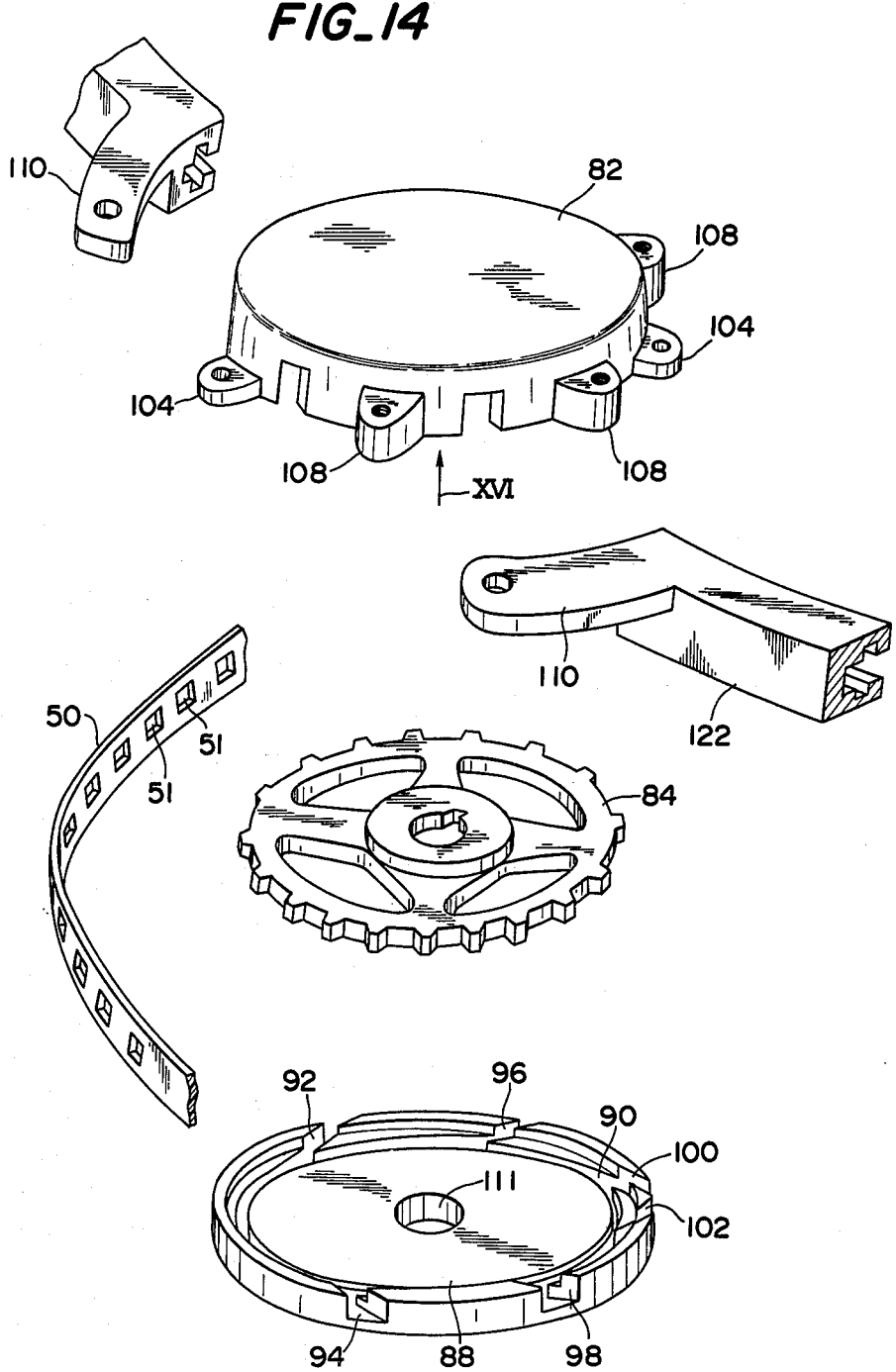

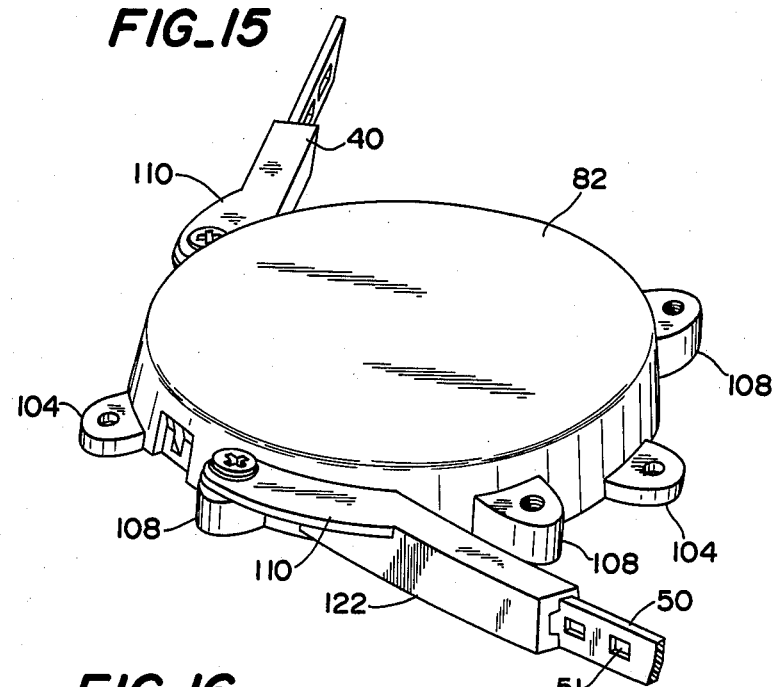
FIG_15
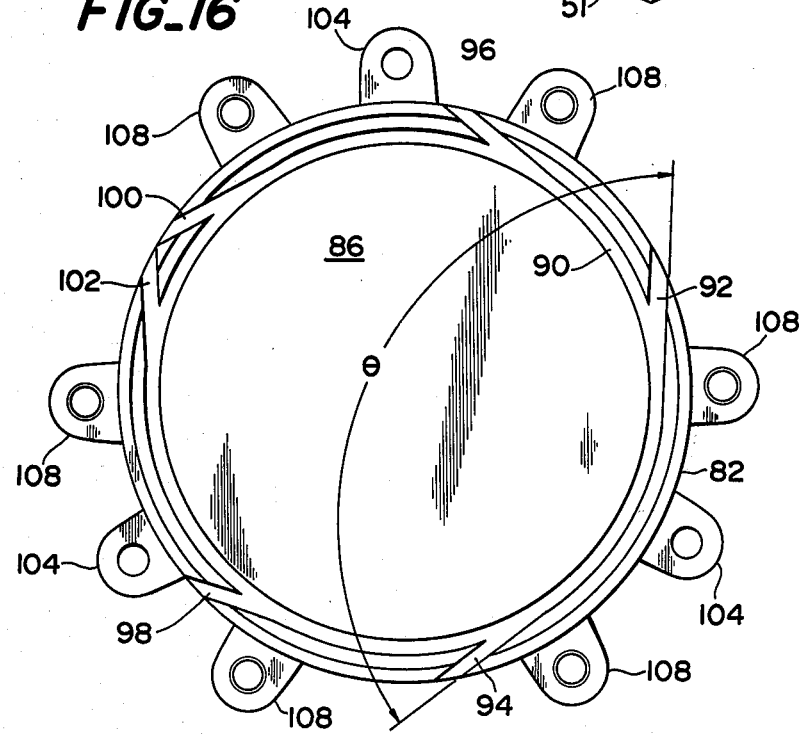
FIG_16

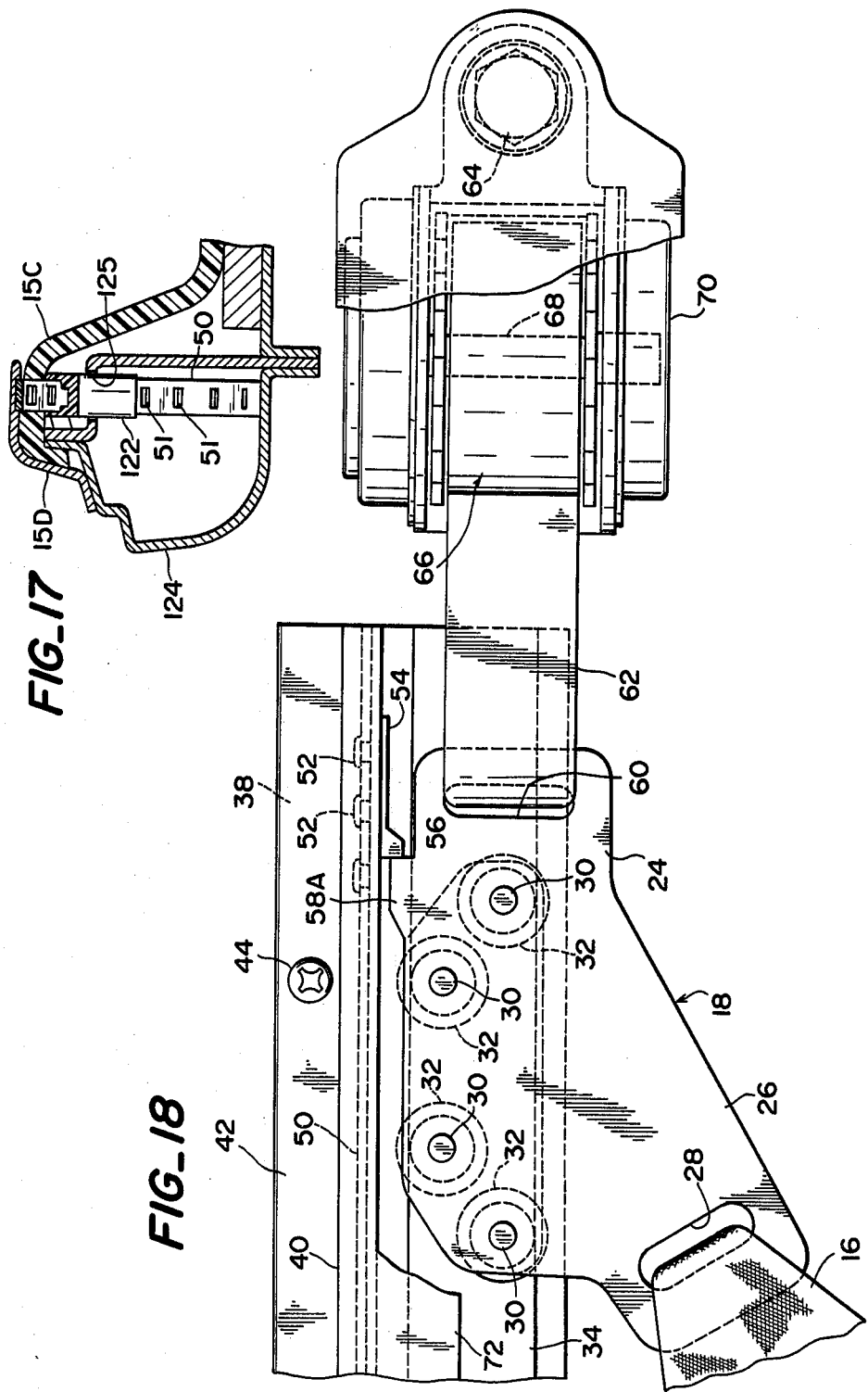

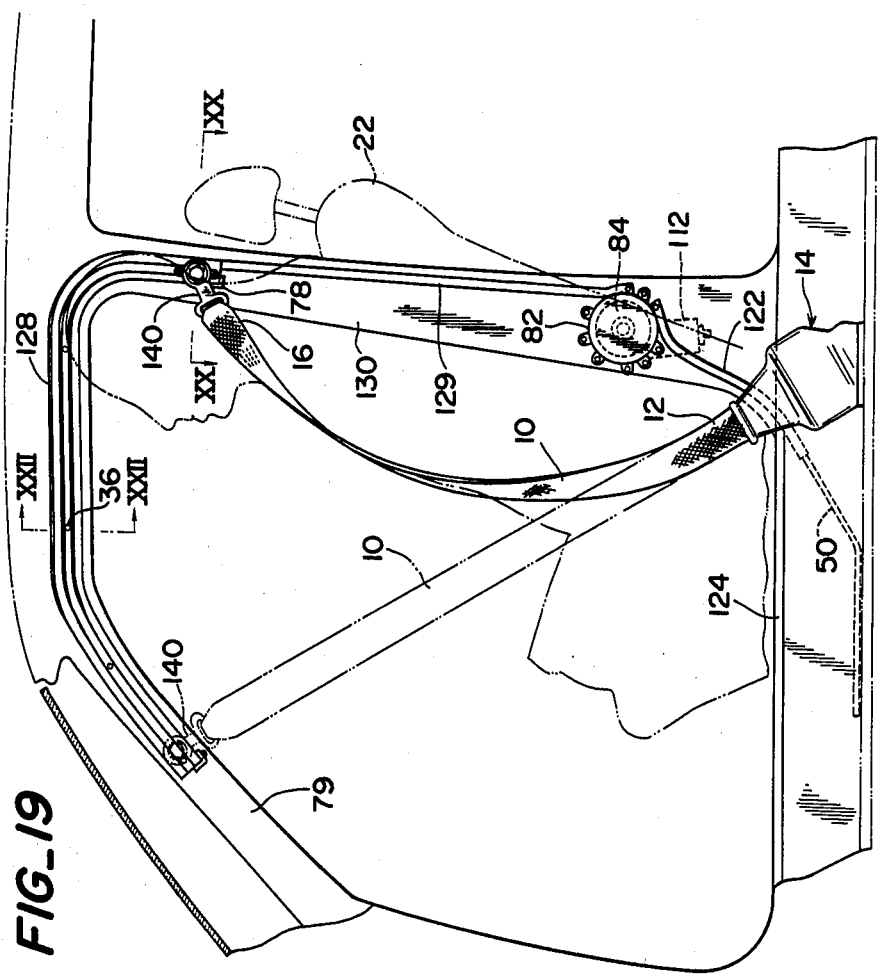

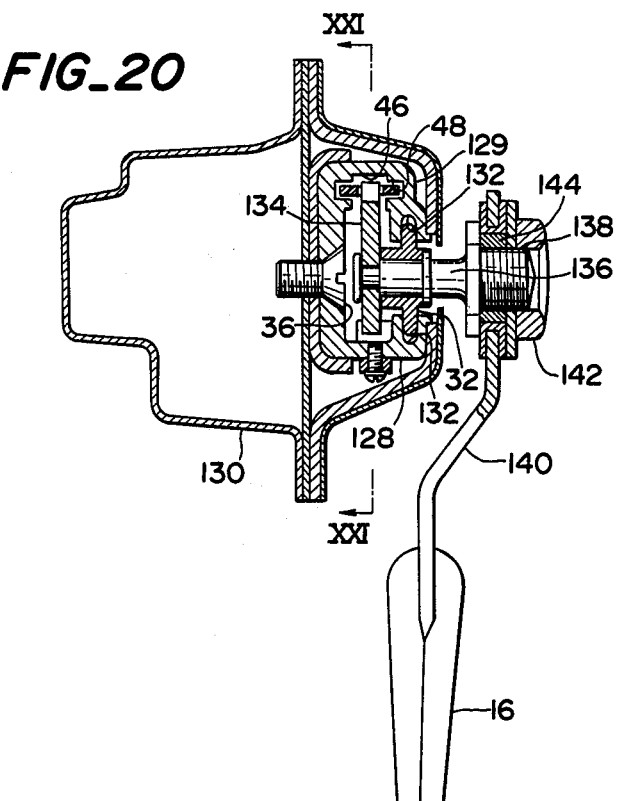
FIG_20
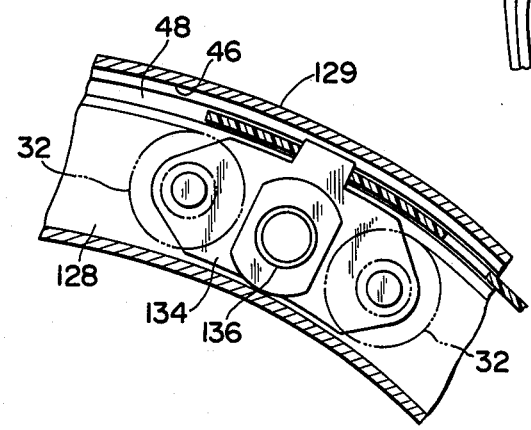
FIG_21

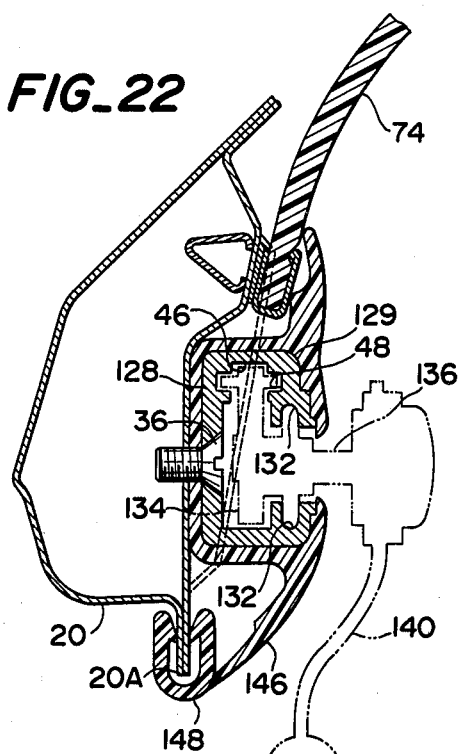
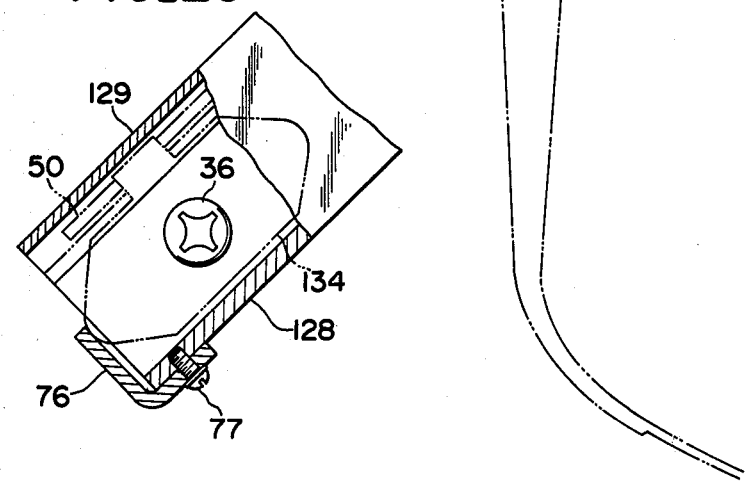

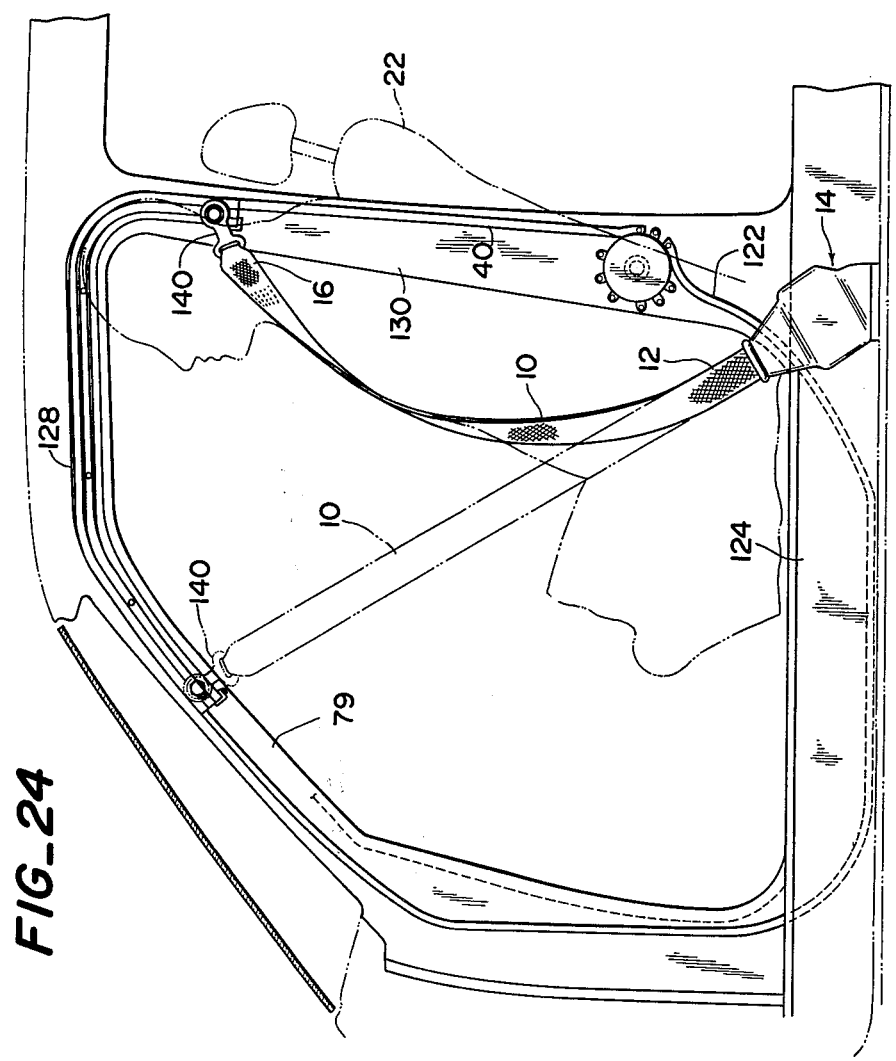

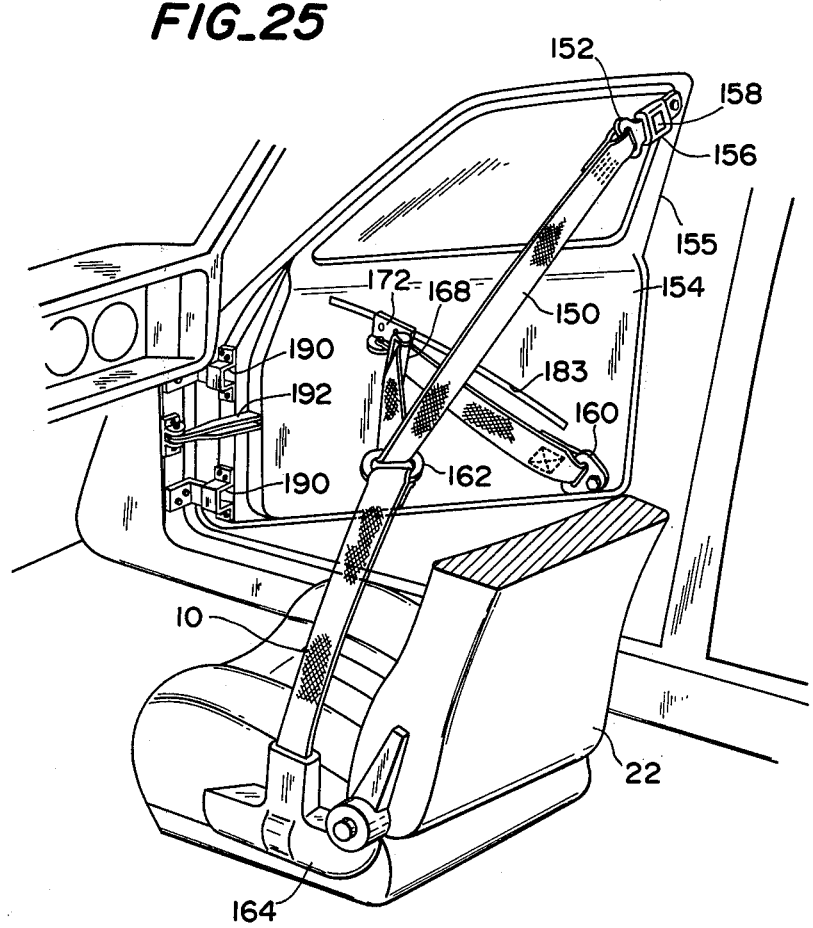
FIG_25

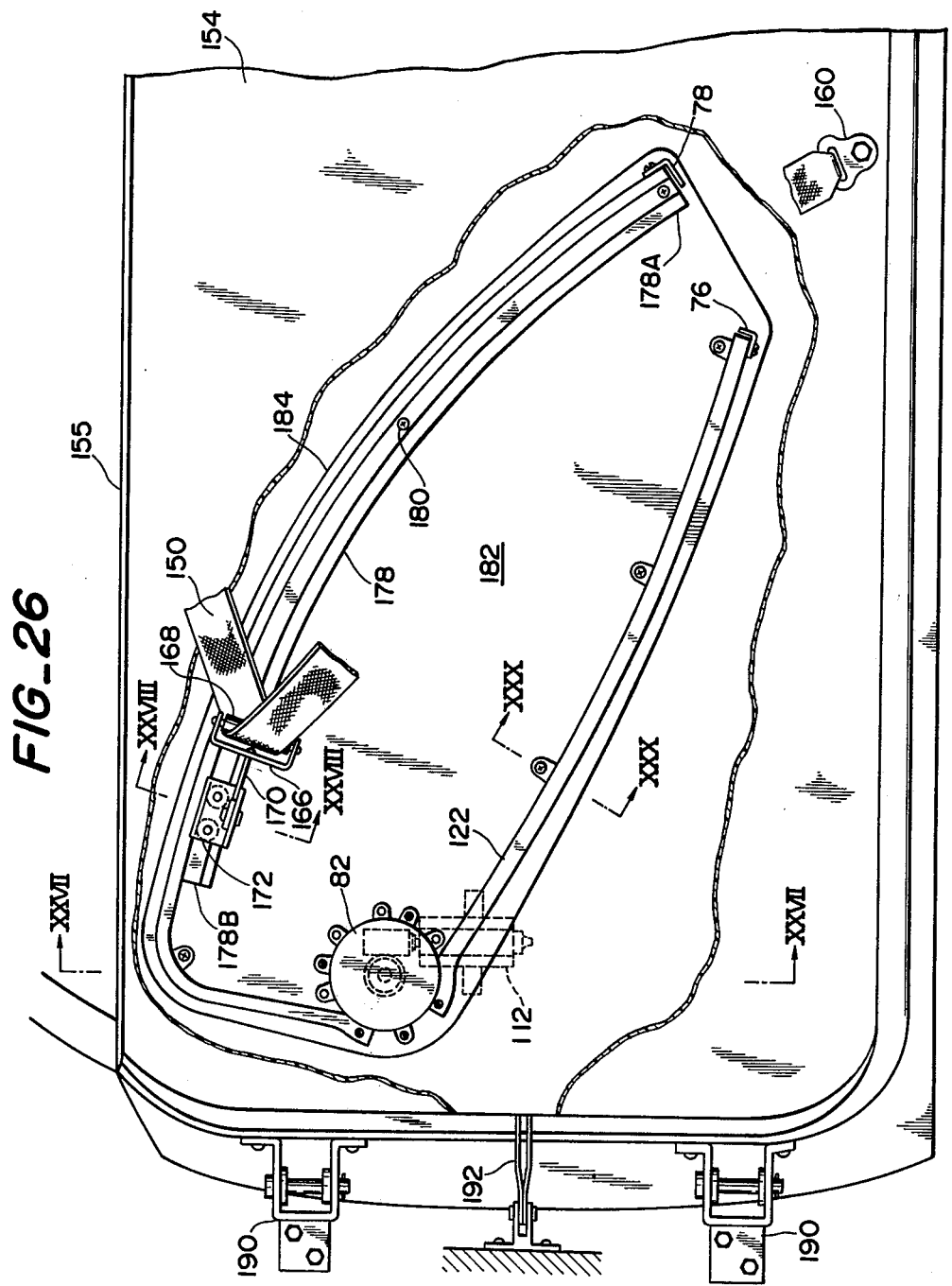

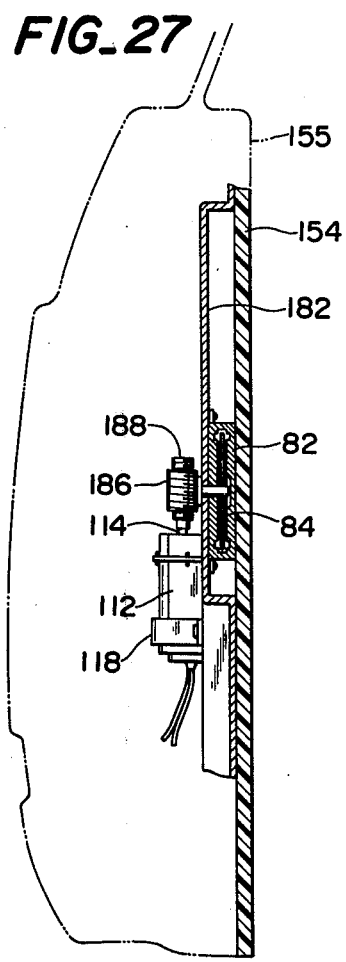
FIG_27
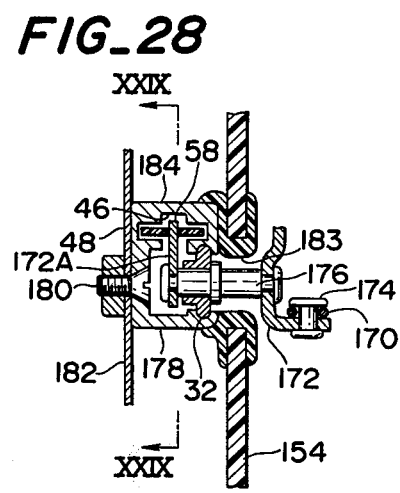
FIG_28
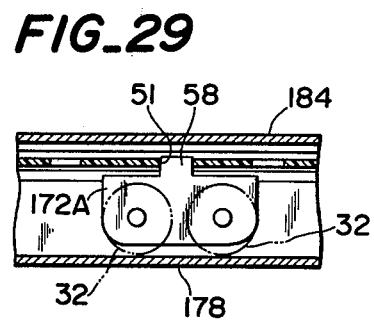
FIG_29
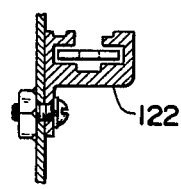
FIG_30

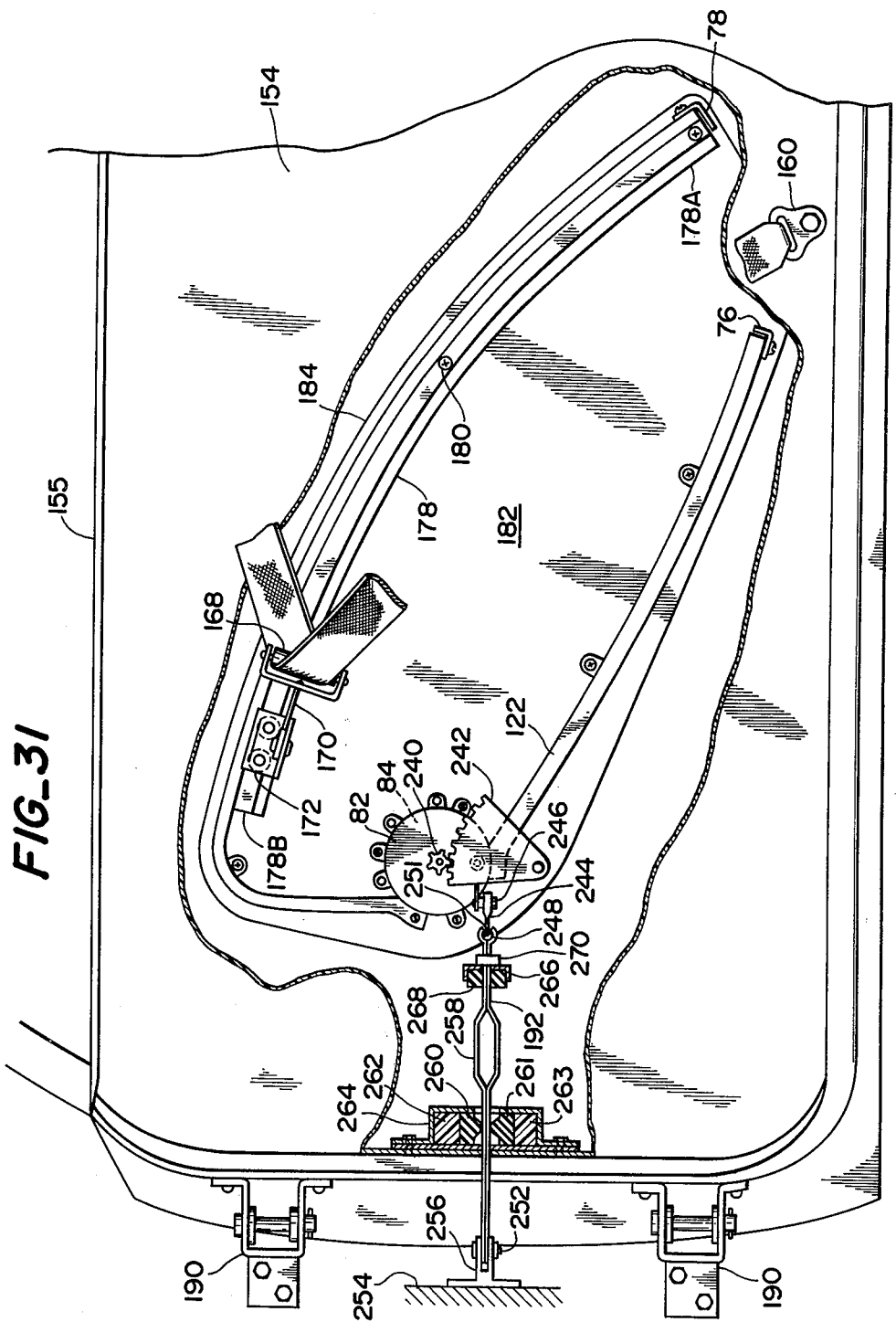

PASSIVE SEATBELT SYSTEM

BACKGROUND OF THE INVENTION

1. Field of the Invention

This invention relates to seatbelt systems and more particularly to passive seatbelt systems which automatically fasten or unfasten a restraining seatbelt on a passenger.

2. Prior Art

Seatbelt systems use passenger restraining belts to restrain and protect passengers while they are riding in vehicles. Such systems make it possible to prevent passengers from colliding with dangerous objects during vehicular emergencies such as a collision and improve passenger safety. However, the percentage of passengers who wear seatbelts is extremely low because of difficulty in donning the seatbelt, etc. As a result, passive seatbelt systems have been proposed which make it possible to automatically fasten the seatbelt around the passenger after the passenger has seated himself in the vehicle. Such seatbelt systems include an outer end of the passenger restraining belt arranged so that it can move back and forth in the direction of the length of the vehicle along the vehicle door or a roof side member. The outer end of the seatbelt is moved back and forth in the direction of the length of the vehicle by being connected to a wire driven by a motor which is electrically connected with an electric power source of the vehicle. In this way, the seatbelt can be caused to approach or move away from the passenger seat. Therefore, with such a prior art seatbelt system, the seatbelt can be automatically fastened around the passenger since after the passenger has seated himself in the vehicle, he is held between the passenger seat and seatbelt which is caused to move toward the seat by the passive seatbelt system.

In such conventional passive seatbelt system, however, the driving force of the motor is transmitted to the end of the seatbelt as tension on a wire. Accordingly, it is necessary to mount wire-turning pulleys inside the vehicle body. In particular, large number of wire-turning pulleys are required in order to optimize the arrangement of various parts of the mechanism and to obtain suitable seatbelt movement. Furthermore, it is necessary to regulate and control the wire tension in an appropriate manner. In addition, it is necessary to resolve a contradictory problem. From the standpoint of motor output and noise generated during the operation of the seatbelt system, it is desirable that the tension on the wire be weak. From the standpoint of reliable transmission of driving force, however, it is desirable that such tension be strong.

SUMMARY OF THE INVENTION

Accordingly, it is a general object of the present invention to provide a passive seatbelt system which is simple, has a small number of component parts, which is small in size and which is easy to assemble and install.

It is another object of the present invention to provide a seatbelt system which operates smoothly and with little noise and displays reliable and uniform performance.

It is still another object of the present invention to provide a passive seatbelt system which provides a large degree of freedom in design.

In keeping with the principles of the present invention, the objects are accomplished by a unique passive seatbelt system. The passive seatbelt system includes a thick tape having a plurality of holes formed therein at regular intervals, a passenger restraining seatbelt coupled at one end to the thick tape, a sprocket wheel which is engaged with the holes in the thick tape and a motor means which is coupled to a power source of the motor vehicle for driving the sprocket wheel. With such a system, the sprocket wheel causes the thick tape to move back and forth to thereby cause the seatbelt to move back and forth along the length of the vehicle. In this way, the seatbelt is automatically fastened or unfastened from the passenger.

BRIEF DESCRIPTION OF THE DRAWINGS

The above-mentioned features and objects of the present invention will become more apparent with reference to the following description taken in conjunction with the accompanying drawings wherein like reference numerals denote like elements and in which:

FIG. 1 is a side view illustrating a first embodiment of a passive seatbelt system in accordance with the teachings of the present invention;

FIG. 2 is a side view of the embodiment of FIG. 1 seen from the front of the vehicle;

FIG. 3 is a partial expanded view of FIG. 1;

FIG. 4 is a cross sectional view along the line IV—IV in FIG. 3;

FIG. 5 is a partial oblique view illustrating the thick tape;

FIG. 6 is a partial view of FIG. 1 illustrating a forward stopper;

FIG. 7 is a cross sectional view along the line VII—VII in FIG. 6;

FIG. 8 is a cross sectional view along the line VIII—VIII in FIG. 3;

FIG. 9 is a cross sectional view along the line IX—IX in FIG. 1;

FIG. 10 is a cross sectional view along the line X—X in FIG. 1;

FIG. 11 is a partial oblique view seen from the vehicle interior which illustrates the installation of the present invention in an area extending from the front pillar to the rocker panel;

FIG. 12 is a cross sectional view along the line XII—XII in FIG. 11;

FIG. 13 is a front view illustrating the sprocket housing;

FIG. 14 is an oblique exploded view of FIG. 13;

FIG. 15 is an assembled oblique view of FIG. 14;

FIG. 16 is a view of the sprocket housing from the back of the housing;

FIG. 17 is a cross sectional view along the line XVII—XVII of FIG. 1;

FIG. 18 is a side view corresponding to FIG. 3 which illustrates a second embodiment of the passive seatbelt system in accordance with the teachings of the present invention;

FIG. 19 is a side view corresponding to FIG. 1 which illustrates a third embodiment of the passive seatbelt system in accordance with the teachings of the present invention;

FIG. 20 is a cross sectional view along the line XX—XX of FIG. 19;

FIG. 21 is a cross sectional view illustrating how the movable plate runs through the bent portion of the guide rail;

FIG. 22 is a cross sectional view along the line XXII—XXII in FIG. 19;

FIG. 23 is a partial cross sectional view illustrating the forward end of the guide rail;

FIG. 24 is a side view corresponding to FIG. 1 which illustrates a fourth embodiment of the passive seatbelt system in accordance with the teachings of the present invention;

FIG. 25 is an oblique view of the vehicle interior which illustrates the fifth embodiment of the passive seatbelt system in accordance with the teachings of the present invention;

FIG. 26 is a partial cross sectional front view which illustrates the door in FIG. 25;

FIG. 27 is a cross sectional view along the line XXVII—XXVII in FIG. 26;

FIG. 28 is a cross sectional view along the line XXVIII—XXVIII in FIG. 26;

FIG. 29 is a cross sectional view along the line XXIX—XXIX in FIG. 28;

FIG. 30 is a cross sectional view along the line XXX—XXX in FIG. 26; and

FIG. 31 is a partial cross sectional front view which illustrates the door of a sixth embodiment of the present invention.

DETAILED DESCRIPTION OF THE INVENTION

Referring more particularly to the Figures, shown in FIGS. 1 and 2 is a first embodiment of the passive seatbelt system in accordance with the teachings of the present invention. In this embodiment, the passenger restraining belt 10 is mounted at its inner end 12 to the vehicle floor 15 via a retractor mechanism 14 which power-retracts the seatbelt 10. The retractor mechanism 14 is installed at the approximate center of the vehicle with respect to the transverse axis of the vehicle. It would also be possible to anchor the inner end 12 of the belt 10 directly to the floor 15, omitting the retractor mechanism 14.

The outer end 16 of the belt 10 is fastened to a truck 18 and can move in the direction of the length of the vehicle along the roof side member 20 of the vehicle. Movement of the outer end 16 causes the belt 10 to approach or move away from the passenger seat 22.

As shown in FIGS. 3 and 4, the truck 18 is provided with a movable plate 24. A slot 28 is formed in an extended portion 26 of the movable plate 24 which projects toward the floor of the vehicle. The outer end 16 of the seatbelt 10 is anchored to the slot 28. Furthermore, four shafts 30 are provided in parallel on the movable plate 24. Drum-shaped wheel 32 whose diameter is reduced in the middle as shown in FIG. 4, are mounted on each of the shafts 30. As further shown in FIG. 4, the wheels 32 are held on a guide rail 34 which is roughly U-shaped in cross sections so that the wheels 32 can roll along the length of the guide rail 34, i.e. in the direction of the length of the vehicle.

The central portion of the guide rail 34 with respect to its U-shaped cross section is fastened to the vehicle-interior side of the roof side member 20 by means of a plurality of fastening screws 36 such that the opening in the guide rail 34 faces toward the vehicle interior. Furthermore, a flange 38 is provided on the top of the guide rail 34 and is fastened by means of fastening screws 44 to a flange 42 which extends upwardly from the top of a slide rail 40. Accordingly, the slide rail 40 is positioned parallel to the guide rail 34. A continuous rectangular groove 46 is formed in the central portion of the slide rail 40 and extends along the length of the slide rail 40. Two slide grooves 48, which substantially increase the width of the rectangular groove 46, are formed at an intermediate depth of the rectangular groove 46 on both sides of the rectangular groove 46. A thick tape 50 shown in FIG. 5 is provided within the slide grooves 48 so that the thick tape 50 can slide along the length of the slide rail 40.

As shown in FIG. 5, the cross-sectional shape of the thick tape 50 is rectangular. A plurality of openings 51 are formed at equal intervals along the length of the tape 50. Furthermore, the dimensions of the rectangular cross section of the thick tape 50 are such that only a small space is left between the tape 50 and the walls and bottoms of the slide grooves 48 of the slide rail 40. Accordingly, the thick tape 50 is able to transmit not only a tensile force but also a compressive force. Furthermore, it is desirable that the tape 50 be made from a synthetic resin material and the thick tape 50 requires an appropriate degree of softness which will make it possible to bend the tape 50.

A sliding block 54 is fastened to one end of the thick tape 50 by means of four rivets 52. A recess 59, which accommodates a projection 58 that projects from the movable plate 24 toward the sliding block 54, is formed in a projection 56 which projects from the sliding block 54 toward the movable plate 24. Inserting the projection 58 into the recess 59 makes it possible to cause the truck 18 to move simultaneously in the direction of the length of the vehicle whenever the sliding block 54 moves together with the thick tape 50 in the direction of the length of the vehicle.

A slot 60 is formed in the rear end of the movable plate 24. One end of a length of narrow belt 62 is anchored to the slot 60. The other end of the narrow belt 62 is retracted on the retractor shaft 68 of a retractor mechanism 66 which is fastened by means of a fastening belt 64 to the roof side member 20 further toward the rear of the vehicle than the guide rail 34. The retractor mechanism 66 is a retractor mechanism of the same design as the retractor mechanism 14 which retracts the inner end 12 of the belt 10. That is, it is a universally known emergency locking retractor which abruptly stops the extension of the belt 62 only during a vehiculular emergency. Under ordinary conditions, the belt 62 is retracted only by the force of a spring 70. Accordingly, the movable plate 24, which is connected to the retractor 66 by means of belt 62, is caused to move toward the rear of the vehicle by the force of the spring 70. During a vehicular emergency, the extension of belt 62 is stopped by the retractor mechanism 66 so that the outer end 16 of the passenger restraining belt 10 is securely anchored to the roof side member 20.

As shown in FIG. 4, a flange 72 extends from the slide rail 40 in an opposite direction from the flange 42, i.e. toward the floor of the vehicle. A roof lining for head liner 74 which lines the roof of the vehicle interior is fastened to the flange 72 by means of fastening screws 75. Accordingly, the guide rail 34, slide rail 40 and truck 18 are clamped between the roof lining 74 and the roof side member 20. As a result, the guide rail 34, slide rail 40 and truck 18 do not project into the interior of the vehicle. Only a narrow opening or slit connected with the vehicle interior is left between the lower end 74A of the roof lining 74 and the lower end 20A of the roof side member 20 so that only the movable plate 24 can move along this opening. Accordingly, the truck 18 and the thick tape 50 which move along the guide rail 34 and slide rail 40 cannot be seen from the passenger compartment. This results in a safe and clean design.

Furthermore, as is shown in FIGS. 6 and 7, L-shaped forward stopper 76 is fastened to the forward end of the guide rail 34 by means of a fastening screw 77. A portion of the stopper 76 projects into the interior of the guide rail 34. Accordingly, this L-shaped forward stopper 76 is able to regulate the maximum amount of movement of the movable plate 24 toward the front of the vehicle, as indicated by the two-dot chain line in FIG. 6. In addition, as is shown in FIGS. 3 and 4, an L-shaped rear stopper 78 is fastened by means of a fastening screw 77 to the slide rail 40 near the end of the guide rail 34. A portion of the stopper 78 projects into the interior of the rectangular groove 46 in the slide rail 40. Accordingly, as is shown in FIG. 3, the L-shaped stopper 78 regulates the amount of movement toward the rear of the vehicle of the thick tape 50 in the slide grooves 48.

As is shown in FIGS. 9 and 10, the slide rail 40 is fastened to the vehicle-interior side of the front pillar 79 of the vehicle by means of fastening screws 44 so that the slide rail 40 drops along the front pillar 79. As is shown in FIG. 11, the lower end of the slide rail 40 is fastened to the sprocket housing 82. In FIGS. 12 through 16 is shown a sprocket housing 82. The sprocket housing 82 takes the form of a thick circular plate. A roughly circular housing recess 86 for the sprocket wheel 84 is formed in the body of the sprocket housing 82. When a cover 88 is fastened to the sprocket housing 82, the housing recess 86 is closed off. An arc-shaped channel 90 is formed near the circumference of the housing recess 86 in the sprocket housing 82 and cover 88. The arc-shaped channel 90 consisting of two matching grooves which are positioned so as to form a channel is smaller in diameter than the housing recess 86. However, the arc-shaped channel 90 cuts deeper into the sprocket housing 82 and the cover 88 than the housing recess 86. The arc-shaped channel 90 accommodates that portion of the thick tape 50 that is engaged with the sprocket wheel 84. In this case, the arc-shaped channel 90 is annular. However, the arc-shaped channel 90 provided in this invention does not necessarily have to be a continuous annular channel. Furthermore, a pair of tape passage channels 92 and 94 which extend more or less tangentially from the arc-shaped channel 90 are cut to the same depth in the sprocket housing 82 and the cover 88 as the arc-shaped channel 90. These channels 92 and 94 are oriented in opposite directions and allow the entrance exit of that portion of the thick tape 50 that engages with the sprocket wheel 84. Accordingly, the thick tape 50 enters the arc-shaped channel 90 via the tape passage channel 92, engages with the sprocket wheel 84 and then exits the sprocket housing 82 via the tape passage channel 92 and 94.

In this invention, spare passage channels 96, 98, 100 and 102, which are tangential to the arc-shaped channel 90 in the housing recess 86, are formed in the sprocket housing 82 and cover 88. Accordingly, the angle of intersection (angle $\theta$ in FIG. 16) of that portion of the thick tape 50 bent in the sprocket housing 82 can be altered.

Furthermore, three fastening flanges 104 project from equal distance points on the circumference of the sprocket housing 82. As is shown in FIG. 12, fastening screws 106 are used to fasten the housing 82 to the front pillar 79 of the vehicle via a bracket 107. As a result, the sprocket housing 82 can be installed on the front pillar 79 with the thick tape 50 already wrapped around the sprocket wheel 84. Therefore, the efficiency of installation work can be improved. Furthermore, with regard to the positioning of the thick tape relative to the sprocket wheel 84 during installation, it is necessary merely to wrap a thick tape 50 around the sprocket wheel 84 with the movable plate 24 in contact with the L-shaped forward stopper 76 (as shown in FIG. 6). Accordingly, positioning of the thick tape 50 is very simple.

Furthermore, six support projections 108, which are similar in shape to the fastening flanges 104 but are thicker, are attached to the circumference of the sprocket housing 82. A fastening part 110 which extends from one end of the slide rail 40 is screw-fastened to one of the support projections 108. Accordingly, when the entrance and exit positions of the thick tape 50 with respect to the sprocket housing 82 are altered, an appropriate support projection 108 corresponding to an appropriate spare passage channels 96 through 102 is selected for attachment of the slide rail 40.

A drive shaft 114 of a reversible motor 112 extends into the interior of the sprocket housing 82 via a central hole 111 in the cover 88 and is coupled to the sprocket wheel 84. The motor 112 is inserted into the interior of the front pillar 79 via a cut-out 116 formed in the front pillar 79. The motor 112 is fastened to the inside of the front pillar 79 by means of a bracket 118 and fastening screws 120. Furthermore, motor 112 is operated by being electrically connected with an electrical power source of the vehicle. The operation is initiated by the opening and closing of the door switch and by actuation of a seat switch which is provided in a passenger seat. By means of the door switch and the seat switch, control of the motor 112 can be accomplished so that the motor 112 is operated to cause appropriate rotation of the sprocket wheel 84.

The direction of rotation of the motor 112 is arranged such that when a passenger opens the door in order to enter or leave the vehicle, the motor turns so that the sprocket wheel 84 is caused to rotate in a counterclockwise direction with respect to FIGS. 1 and 3; when the door is closed, the motor operates so that the sprocket wheel 84 is caused to rotate in a clockwise direction. Furthermore, the number of revolutions completed by the sprocket wheel 84 is set such that the truck 18 will stop before it contact the L-shaped forward stopper 76 at the forward end of the guide rail 34 and such that the truck 18 stops before the thick tape 50 contacts the L-shaped rear stopper. The amount of rotation of the motor can be controlled by some mechanical device or electrical circuitry well known in the art.

A second slide rail 122 is fastened to the sprocket housing 82 by means of fastening screws. As is shown in FIG. 11, this second slide rail 122 extends from the lower end of the front pillar 79 into the interior of the rocker panel 124 of the vehicle via an opening 125. When the sprocket wheel 84 is caused to rotate in a counterclockwise direction, the thick tape 50 is pushed into the second slide rail 122 and into the interior of the rocker panel 124. Furthermore, it should be apparent that the thick tape 50 is at least long enough to reach from the sprocket housing 82 to the movable truck 18 when the truck 18 is at its maximum rear position so that driving force of the sprocket wheel 84 is always transmitted to the truck 18.

In practice it is desirable that the guide rail 34 and the slide rail 40 be made of aluminum. In addition, in the Figures for the sake of completeness a front pillar garnish 15A shown in FIG. 9, a cowl side trim 15B is shown in FIG. 10 and carpet and scuff plate 15C and 15D respectively are shown in FIG. 17.

For the purposes of description of the operation of the present invention, it should be assumed that the following initial conditions exist which are as shown in FIG. 1. In particular, the vehicle is in motion and the passenger is wearing the belt 10. Furthermore, the truck 18 has completed its maximum amount of movement toward the rear of the guide rail 34 so that the belt 10 is fastened around the passenger. With the belt 10 thus fastened, the belt 10 can be extended from the retractor mechanism 14 so that the passenger can alter his driving position.

In operation, if the vehicle is involved in an emergency, such as a collision, the emergency locking mechanisms inside the retractor mechanisms 14 and 16 abruptly stop the extension of the belt 10 and the narrow belt 62. As a result, the outer end 16 of the belt 10 is securely anchored to the roof side member 20 by the truck 18 and the passenger is restrained and his safety is insured.

When the passenger opens the door in order to leave the vehicle, the motor 112 causes the sprocket wheel 84 to rotate in a counterclockwise direction. As a result, tension is applied to the thick tape 50 so that the tape 50 moves through the slide rail 40 in the direction indicated by the arrow A. Therefore, the truck 18, which is engaged with the tape 50 via the sliding block 54, is caused to move toward the front of the vehicle along the guide rail 34. Accordingly, the outer end 16 of the belt 10 is caused to move a considerable distance toward the front of the vehicle, as indicated by the two-dot chain line in FIG. 1. As a result, a sufficient space for the passenger to leave the vehicle is formed between the belt 10 and the passenger seat 22 and the passenger is easily able to exit the vehicle.

When the passenger closes the door (not shown in the Figures) after re-entering the vehicle and seating himself in the passenger seat, the motor 112 is reversed so that the compressive force is applied to the thick tape 50 to thereby cause the thick tape 50 to move in a direction opposite to the direction indicated by the arrow A. Accordingly, the sliding block 54 moves toward the retractor mechanism 66. Therefore, the truck 18 moves toward the retractor mechanism 66, i.e. toward the rear of the vehicle and the belt 10 is automatically fastened around the passenger (as shown in FIG. 1).

Since the motor 112 is installed in a lower portion of the front pillar 79, an advantage is derived in that the noise generated by the motor 112 when the belt 10 is driven as described above is muffled and the passenger is not bothered to any appreciable extent.

Referring to FIG. 18, shown therein is a second embodiment of the passenger seatbelt system in accordance with the teachings of the present invention. In this embodiment a different means is utilized to couple the movable plate 24 to the thick tape 50. In particular, a projection 56 on the sliding block 54 is caused to contact from the rear, a projection 58A which projects from the movable plate 24 toward the thick tape 50. In this embodiment, both projections 56 and 58A can move separately from each other and are not fixed to each other. Accordingly, the movable plate 24 can be moved toward the front of the vehicle independently of the sliding block 54. Thus, in this embodiment, the movable plate 24 can move toward the front of the vehicle when the passenger alters his driving position while wearing the belt 10. Therefore, the freedom of movement of the passenger is increased. In addition, even if the pasenger should grasp the belt 10 or deliberately move his body while the outer end 16 of the belt 10 is being moved by the driving of the thick tape 50, the truck 18 can be moved separately from the slide block 54. Therefore, the various parts or the components of the mechanism are protected from the damage. The remainder of the elements of the second embodiment are substantially the same as that of the first embodiment and like elements are given like reference numerals and the description of their interconnection in operation are omitted.

Referring to FIG. 19, shown therein is a third embodiment of the passive seatbelt system in accordance with the teachings of the present invention. This embodiment differs from the first and second embodiments in that no retractor mechanism is provided on the roof side member. Furthermore, in this embodiment, a guide rail 128, whose central portion runs in the direction of the length of the vehicle is fastened to the roof side member 20. In this case, however, the forward portion of the guide rail 128 runs along the front pillar 79 while the rear portion of the guide rail 128 is bent at an appropriate angle from the central portion of the guide rail 128 and extends toward the floor of the vehicle such that this portion of the guide rail 128 is roughly perpendicular to the central portion of the guide rail 128.

Furthermore, as is shown in FIGS. 20 and 22, the guide rail 128 is U-shaped in cross section. In addition, a slide rail 129 is integrally attached to the slide rail 128. Inside the slide rail 129 are a rectangular groove 46 and slide grooves 48. Furthermore, a pair of recessed grooves 132 which face each other across the opening in the guide rail 128 are formed along the length of the opening in the guide rail 128. These recess grooves 132 accommodate and guide a pair of wheels which are rotatably mounted on the movable plate 134 shown in FIG. 21.

An anchor bolt 136 projects horizontally through the central portion of the movable plate 134 toward the interior of the vehicle. An outer anchor plate 140 is anchored to the outer end 16 of the belt 10 and is rotatably mounted on screw 138 formed on the tip of the anchor bolt 136. Furthermore, a nut 142 is screwed down over the screw 138 to prevent the anchor plate 140 from slipping off. A spacer 144 is interposed between the nut 142 and the anchor bolt 136.

As is shown in FIGS. 19 and 22, the guide rail 128 is fastened to the vehicle-interior sides of the roof side member 20, the front pillar 79 and the center pillar 130 by means of fastening screws 36. A garnish 146 is molded beforehand to the periphery of the guide rail 128. This garnish 146 connects the guide rail 128 with the roof lining 74 and with the opening trim 148 which covers the lower end 20A of the roof side member 20. Accordingly, the guide rail 128 can be seen from the interior of the vehicle.

Furthermore, as in the first embodiment, an L-shaped stopper 76 is fastened to the forward end of the guide rail 128 by means of the fastening screw 77 and an L-shaped rear stopper 78 is fastened to the rear end of the guide rail 128 by means of a fastening screw 77. As a result, the stroke of the movable plate 134 is limited. In addition, the slide rail 129 extends vertically downward beyond the end of the guide rail 128 which is dropped along the center pillar 130. This end of the slide rail 129 is fastend to a sprocket housing 82 which is fastened to the vehicle-interior side of the center pillar 130. As in the first and second embodiments, the thick tape 50 is caused to engage with a sprocket wheel 84 which is provided within the housing 82. Furthermore, a second slide rail 122 is dropped from the sprocket housing 82 into the interior of the rocker panel 124. Accordingly, when the sprocket wheel 84 is caused to rotate in a clockwise direction, the thick tape 50 which is caused to move downward by the sprocket wheel 84 is pushed into the interior of the rocker panel 124.

As in the first and second embodiments, the sprocket wheel 84 housed in the sprocket housing 82 is driven by a reversible motor 112. This motor is fastened to the center pillar 130. The stroke of the outer anchor plate 140 runs from a position indicated by the solid lines in FIG. 19 to the position indicated by the two-dot chain lines in FIG. 19.

For the description of the operation of the third embodiment, it is assumed that the situation exists that is illustrated in FIG. 19. In particular, passenger has already been automatically fastened by the seatbelt 10 and the outer anchor plate 140 is located at the lower end of the portion of the guide rail 128 which is provided along the center pillar 130.

In operation, when the passenger changes his driving position under normal vehicle operating conditions, the belt 10 is extended from the retractor mechanism 14 fastened to the vehicle floor 15. Accordingly, the passenger is easily able to change his driving position. However, since the outer anchor plate 140 cannot move toward the front of the vehicle in a direction perpendicular to the guide plate 128, there is no movement of the outer anchor plate 140.

Furthermore, if the vehicle is involved in a collision, the extension of the belt 10 is abruptly stopped by the retractor mechanism 14 and there is no change in the position of the outer anchor plate 140. Therefore, the passenger is securely restraind by the belt 10 and his safety is insured.

However, when the passenger opens the door in order to leave the vehicle, the driving force of the motor 112 causes the sprocket wheel 84 to rotate in a couterclockwise direction and the thick tape 50 causes the movable plate 134 to move toward the front of the vehicle. Accordingly, the outer anchor plate 140 moves along the center pillar 130, the roof side member 20 and the front pillar 79 until it reaches the forward end of the guide rail 128 where it stops (as indicated by the two-dot chain line in FIG. 19). Thus, a sufficient space for the passenger to leave the vehicle is formed between the belt 10 and the seat 22 and the passenger can easily exit from the vehicle. Therefore, in this third embodiment, it is possible to restrain the passenger without any need for a special locking device at the outer end of the seatbelt 10.

Referring to FIG. 24, shown therein is a fourth embodiment of the passive seatbelt system in accordance with the teachings of the present invention. In this embodiment, the second slide rail 122 further extends so that the end of the side rail 122 connects with the end of slide rail 128 which is dropped along the front pillar 79. Furthermore, the thick tape 50 which is guided through the slide rail 128 and the second slide rail 122 is installed as a loop inside the slide rail 128 and second slide rail 122. As a result, only a tensile force acts on the thick tape 50 when the tape 50 is driven and smooth driving of the tape 50 naturally becomes possible. The remaining elements of this fourth embodiment are substantially the same as that of the third embodiment and are given like reference numerals and the description of their interconnection in operation will be omitted.

Referring to FIGS. 25 through 30, shown therein is a fifth embodiment of the passive seatbelt system in accordance with the teachings of the present invention. In this embodiment, an outer side belt 150 is provided in addition to the belt 10. One end of the outer side belt 150 is engaged via tongue plate 152 with a buckle mechanism 156 fastened to the upper rear portion of the vehicle door 154. This buckle mechanism 156 is a universally known buckle mechanism used in ordinary seatbelt systems. If necessary, the tongue plate 152 can be easily released by pressing a release button 158 in the buckle mechanism 156.

The other end of the outer side belt 150 is fastened to the lower rear portion of the door 154 by an anchor plate 160. The intermediate portion of the outer belt 150 is passed through a connecting ring 162 which is fastened to the tip of the belt 10. This connecting ring 162 is able to move freely along the length of the outer side belt 150. Furthermore, the base end of the belt 10 (the end of the belt to which the connecting ring 162 is fastened) is retracted by a retracting mechanism 164 which is provided on the side of the passenger seat 22 on the opposite side from the seat from the vehicle door 154. An emergency locking retractor similar to the retractor mechanisms 126 and 14 can be used for the retractor mechanism 164. Furthermore, it would also be possible to fasten the retractor mechanism directy to the floor 15 as in the above described embodiments.

The portion of the belt 150 between the connecting ring 162 and the anchor plate 160 is turned around a guide roller 168 which is rotatably mounted on a U-shaped frame 166. The U-shaped frame 166 is anchored to a movable plate 172 by a wire 170 so that the frame 166 moves together with the movable plate 172. As is shown in FIG. 28, the movable plate 172 is L-shaped in cross section. The wire 170 is anchored to one portion of the movable plate 172 by a pin 174. Anchor bolts 176 are fastened to another portion of the movable plate 172 and a pair of wheels 32 are rotatably mounted on the anchor bolts 176. The movement of these wheels 32 is guided by a guide rail 178. As is shown in FIG. 28, the guide rail 178 is fastened to the door panel 182 by means of fastening screws 180. As is shown in FIG. 26, one end 178A of guide rail 178 is located above the anchor plate 160 in the lower rear portion of the door 154 while the other end 178B of the guide rail 178 is located in the upper front portion of the door 154. An intermediate portion of the guide rail 178 takes the form of an appropriate circular arc which connects the end 178A with the end 178B. Accordingly, the movable plate 172 is able to move from one end 178A of the guide rail 178 to the other end 178B of the guide rail 178. When the movable plate 172 moves toward the end 178B of the guide rail 178, the guide roller 168 causes an intermediate portion of the belt 150 to move toward the front of vehicle, as shown in FIG. 25. As a result, sufficient space for the passenger to enter or leave the vehicle is formed between the belts 150 and 10 and the passenger seat 22. Conversely, when the movable plate 172 moves toward the end 178A of the guide rail 178, the tension on the belt 10 is reduced and the excess portion of the belt 10 is retracted by the retractor mechanism 164. As a result, the connecting ring 162 moves toward the retractor mechanism 164. When the connecting ring 162 moves toward the retractor mechanism 164, the two ends of the belt 150 turned around the connecting ring 162 to contact respectively the shoulder and the lap of the passenger seated in the seat 22 so that the passenger is restrained by a three-point seatbelt system. Furthermore, a slot 183 is formed in the door trim 154 along the guide rail 178 so that the anchor bolts 176 can move.

As is shown in FIG. 28, a slide rail 184 is formed in an integral part of the guide rail 178 provided inside the door 155. As in the other embodiments, the slide rail 184 has a rectangular groove 46 and slide grooves 48 so that the thick tape 50 can slide along the length of the slide rail 184. As is shown in FIG. 29, a projection 58 on the movable plate 172A is inserted into one of the openings 51 near one end of the thick tape 50 so that the movable plate 172A are caused to move together with the thick tape 50.

One end of the slide rail 184 extends beyond the end 178B of the guide rail 178. As is shown in FIG. 26, this end of the slide rail 184 is bent downwardly at the forward end of the door 155 and is fastened to a sprocket housing 82 which is fastened to the door panel 182. As a result, the thick tape 50 is caused to engage with the sprocket wheel 84 which is provided inside the sprocket housing 82. As in the other embodiments, a second slide rail 122 is fastened to the sprocket housing 82. This second slide rail 122 is used to guide the thick tape 50 which is pushed out of the sprocket housing 82.

As is shown in FIG. 27, a driving shaft 114 of the reversible motor 112 which is fastened to the door panel 182 by means of a bracket 118 is coupled to the sprocket wheel 84 via a worm gear 187 and a worm wheel 188. The reversible motor 112 is electrically connected with the electrical power source of the vehicle. When the passenger opens the door 155 in order to enter the vehicle, the reversible motor 112 causes the sprocket wheel 84 to rotate in a counterclockwise direction. This causes the movable plate 172A to move toward the end 178B of the guide rail 178. On the other hand, when the passenger closes the door after seating himself in the vehicle, the movable plate 172A is caused to move toward the end 178A of the guide rail 178. These movement strokes are set so that the movable plate 172A stops when it reaches the vicinity of the end 178A or the end 178B of the guide rail 178.

Furthermore, as is shown in FIG. 26, an L-shaped rear stopper 78 is fastened to the end of the slide rail 184 and an L-shaped forward stopper 76 is fastened to the end of the second slide rail 122. These stoppers 76 and 78 limit the maximum stroke of the thick tape 50. In addition, in FIGS. 25 and 26, the door is provided with hinges 190 and a door check 192 which regulates the opening and closing force and angle of rotation of the door.

In operation, when the passenger opens the door 155 in order to enter the vehicle, the motor 112, via the sprocket wheel 84, causes the thick tape 50 to slide through the slide grooves 48 of the slide rail 184. Therefore, the movable plate 172A is caused to move toward the end 178B of the guide rail 178 (as shown in FIGS. 25 and 26). Thus, the guide roller 168, which is connected with the movable plate 172 by the wire 170, causes the outer side belt 150 to be bent substantially toward the front of the vehicle (as shown in FIG. 25). As a result, the belt 10 is extended from the retractor mechanism 164 so that the belt 10 and belt 150 both move toward the front of the vehicle. As a result, the belt 10 and belt 150 are both substantially separated from the passenger seat 22 such that a sufficient space is formed for the passenger to enter the vehicle.

When the passenger closed the door after seating himself in the vehicle, the motor 112 is reversed so that the movable plate 172A is caused to move toward the end 178A of the guide rail 178. As a result, the bend in the portion of the belt running between the anchor plate 160 and the connecting ring 162 is straightened out and the tension on the outer side belt 150 is reduced. Therefore, the belt 10 is power retracted by the retractor mechanism 164 and the connecting ring 162 moves toward the retractor mechanism 164. As a result, the outer side belt 150 (which is bent through the connecting ring 162 at an intermediate point) contacts the shoulder and the lap of the passenger so that the passenger is placed under a three-point seatbelt restraint.

If the vehicle is later involved in an emergency such as a collision, the emergency locking mechanism of the retractor mechanism 164 senses the existence of a vehicular emergency condition and stops the extension of the belt 10. As a result, the passenger is restrained by the belts 10 and 150. Therefore, the passenger is prevented from being thrown toward the front of the vehicle and his safety is insured.

Should it be necessary for the passenger to escape to the outside of the vehicle following a collision, the passenger need merely press the release button 158 of the buckle mechanism 156. If this is done, the tongue plate 152 is released from the buckle mechanism 156 and the passenger is released from the seatbelt. Therefore, the passenger can open the door 155 and easily escape to the outside of the vehicle.

When the passenger opens the door 155 in order to leave the vehicle after the vehicle has stopped (under normal operating conditions), the motor 112 is reversed and the guide roller 168 moves toward the front of the vehicle so that the outer side belt 150 is bent. As a result, a sufficient space for the passenger to leave the vehicle is formed between the belts 10 and 150 and the seat 22 and the passenger can easily leave the vehicle.

It should be apparent that in this fifth embodiment, the driving force used to drive the sprocket wheel is not necessarily limited to a motor 112. It would also be possible to utilize the opening and closing force of the door 155. In other words, it would also be possible to cause the movable plates 172 and 172A to move in response to the opening and closing of the door by interposing a speed-amplifying mechanism consisting of a gear train between the door check 192 and the sprocket wheel 84.

In FIG. 31, there is shown a sixth embodiment where instead of the motor 112 of the fifth embodiment other means for driving the sprocket wheel 84 by using the force generated with the movement of the door 155. The sprocket wheel 84 has a small gear wheel 240 to rotate together such that the small gear wheel 240 gears with a sector gear 242. Since the radius of the sector gear 242 is several times larger than that of the small gear wheel 240, this embodiment provides a stroke enlarging mechanism to cause the sprocket wheel 84 and the small gear wheel 240 to rotate several times only by rotating the sector gear 242 by a certain angle.

A driving arm 244 is attached to the sector gear 242 with its one end held with a pin 246 and with the other end having a ball-shaped tip 248 inserted and held in a spherical space 251 of an end of a door check lever. Therefore, the ball-shaped tip 248 and the spherical space 251 form a ball joint, which allows the driving arm 244 and the door check lever rotate freely.

The other end of the door check lever 192 extends outward over the door 155 and is coupled to a hinge-plate 256 with a pin. As a result, when the door 155 is closed, the door check lever 192 will cause the sector gear 242 to rotate clockwise as shown in FIG. 31 thereby pushing the guide roller 168 toward the stopper 78; and when the door 155 opens, the guide roller 168 is caused to move backward.

The door check lever 192 has a bulge at its center which functions as a check point 258. Between the check point 258 and the pin 252 there are disposed shoes 260 and 261. The shoes 260 and 261 are contained with rubber pads 262 and 263 in a case 264 attached to the door 155. Since the rubber pads 263 and 264 are provided behind the shoes 260 and 261, the shoes 260 and 261 are always forced to keep contact with the door lever 192. Accordingly, when the door 155 is open to a certain angle, the shoes 260 and 261 will touch the check point 258 of the door check lever 192 and give some resistance against the opening power of the door 155.

Further, there is provided a cushion 268 in an end plate 266 attached to a pin 270 between the check point 258 and the spherical space 251 whereby when the door 155 is opened further the case 264 will touch the cushion 268 to regulate the maximum angle for opening.

In this embodiment, the structure of the door check and the mechanism for regulating the maximum angle for opening are chosen from the types which are conventional.

According to this embodiment, since one end of the door check lever 192 is coupled to the body and the other end is attached to the driving arm 244, the driving arm 244 will allow the sector gear 242 to rotate thereby causing the small gear wheel 240 and the sprocket wheel 84 to transfer the enlarged strokes through the movement of the tape 50, as the door 155 is opened for a passenger. Therefore, the guide roller 168 coupled to the tape 50 will move toward the upper front portion of the door 155 and the central portion of the webbing 150 will get apart from the passenger seat to form an appropriate space for the passenger.

Since the door check mechanism is the type which is generally used, it will give some resistance against the opening force of the door, and beyond a certain angle, the cushion 268 will touch the case 264 to regulate the maximum opening angle.

When the passenger is seated and the door 155 is closed, the door checking mechanism will force the sector gear 242 to move backward. Therefore, the guide roller 168 moves toward the stopper 78 and the webbing 150 will get back toward the passenger seat. Thus, the passenger will be safely held by the webbing 150 and 10. In this situation, since the webbing 10 is controlled by the retractor 164, the webbing 10 150 will have an appropriate tension, when the guide roller 168 moves back to its position.

In case the car crashes, an emergency lock mechanism (not shown) of the retractor 164 works such that the retractor 164 will not allow the webbing to extend.

When the passenger gets off, the mechanism works in the contrary order.

The above explanation is given in connection with a structure where the stroke enlarging mechanism is attached to the door 155; however, it should be understood that the mechanism may be disposed in other location such as the body 254.

From the above description, it is apparent that the passive seatbelt system in accordance with the teachings of the present invention possesses certain advantages of the prior art. These advantages include a small number of component parts, a system which is small in size, a system whose assembly and installation is easy, a system that operates smoothly, a system which is quiet, and a system whose degree of design freedom is substantially large.

It should be apparent to those skilled in the art that the above described embodiments are merely illustrative but a few of the many possible specific embodiments which represent the application of the principles of the present invention. Numerous and varied other arrangements can be readily devised by those skilled in the art without departing from the spirit and scope of the invention.

I claim:

1. A passive seatbelt system for a vehicle comprising:
   a passenger-restraining seatbelt, one end of which is positioned at the center of the vehicle and the other end of which passes across a passenger seat of the vehicle and is disposed at the side of the vehicle;
   a flexible non-continuous tape;
   a plurality of openings formed along the length of said tape;
   a sprocket wheel provided with a multiple number of projections which engage with the openings in said tape, said sprocket wheel comprising the sole element for applying to said tape substantial tensile force and compressive force;
   a reversible driving system for driving said sprocket wheel;
   means for coupling said tape to a portion of said seatbelt which is remote from said one end thereof, said coupling means enabling said tape to move said portion of said seatbelt selectively towards the front and the rear of the vehicle; and
   slide rail means in engagement with said tape for enabling said tape to transmit tensile and compressive forces upon rotation of said sprocket wheel;
   whereby driving force of the driving system causes at least said other end end of the passenger-restraining belt to move along the vehicle body to thereby cause said belt to approach or move away from the passenger and be automatically fastened around or removed from said passenger.

2. A passive seatbelt system as defined in claim 1, wherein said slide rail means is installed along a roof side member of the vehicle so that it is substantially linearly oriented in the direction of the length of the vehicle and said end of the belt is guided substantially linearly along said slide rail means.

3. A passive seatbelt system as defined in claim 1, wherein an intermediate portion of said slide rail means is installed along a roof side member of the vehicle so that it is substantially linearly oriented in the direction of the length of the vehicle, a rear portion of said slide rail is dropped along a center pillar of the vehicle and the end of the belt is guided along said slide rail means.

4. A passive seatbelt system as defined in claim 1, wherein said tape is run along the front pillar, rocker panel and center pillar of the vehicle.

5. A passive seatbelt system as defined in claim 1, said driving system including a motor, said motor being positioned adjacent the lower portion of the vehicle adjacent the rear of the front seat thereof.

6. A passive seatbelt system as defined in claim 1, wherein said coupling means comprises a truck which is guided by a guide rail that is installed along said slide rail means.

7. A passive seatbelt system as defined in claim 1, wherein said driving system comprises a motor which is electrically connected with an electrical power source of the vehicle.

8. A passive seatbelt system as defined in claim 7, wherein said motor is installed in the bottom of the front pillar of the vehicle.

9. A passive seatbelt system for a vehicle comprising:
a restraining seatbelt, one end of which is positioned at the center of the vehicle, the seatbelt passing across a passenger seat of the vehicle and having its other end disposed at the side of the vehicle;
a flexible non-continuous tape having a plurality of openings therealong;
means comprising a sprocket wheel engaging said tape for driving said tape axially thereof in either direction, said means comprising the sole means for applying to said tape substantial tensile force and compressive force;
a transmission means for transmitting the movement of said tape to the seatbelt by connecting said tape with the seatbelt, said transmission means enabling said tape to move said portion of said seatbelt selectively towards the front and the rear of the vehicle; and
slide rail means in engagement with said tape for enabling said tape to transmit tensile and compressive forces to cause said tape to move axially thereof in either direction
whereby a portion of the seatbelt is moved along a longitudinal direction of the vehicle to thereby cause said seatbelt to approach or move away from a passenger seated in said seat.

10. A passive seatbelt system as defined in claim 9, said driving system including a motor, said motor being positioned adjacent the lower portion of the vehicle adjacent the rear of the front seat thereof.

11. A passive seatbelt system according to claim 9, wherein an inner side end of the seatbelt is retracted by a retracting mechanism.

12. A passive seatbelt system according to claim 9, wherein said driving means includes a motor whose direction of rotation is reversible according to the opening and closing of the door.

13. A passive seatbelt system according to claim 9, wherein said plurality of openings are formed at equal intervals along the length of said tape.

14. A passive seatbelt system according to claim 9, wherein said slide rail means is provided with a slider guide groove, and wherein said transmission means comprises a slider slidable along said slider guide groove.

15. A passive seatbelt system according to claim 14, wherein said transmission means comprises a slider slidable along said slider guide groove.

16. A passive seatbelt system according to claim 15, wherein a connecting means is provided so that said connecting means connects said tape with said slider to transmit the movement of said tape to said slider.

17. A passive seatbelt system according to claim 16, wherein said connecting means comprises a projection formed on said slider and an aperture formed in said tape, said projection engaging with said aperture.

18. A passive seatbelt system according to claim 16, wherein a projection is formed on said tape and a recess which engages with said projection is formed in said slider.

19. A passive seatbelt system according to claim 15, wherein the outer end of the seatbelt is connected with said slider.

20. A passive seatbelt system according to claim 9, wherein said slide rail means is extended along the side of a roof of the vehicle in a rear direction of the vehicle.

21. A passive seatbelt system according to claim 20, wherein the forward end portion of said slide rail means extends downwardly along a front pillar of the vehicle and the rear end portion thereof extends downwardly along a center pillar thereby forming approximately a U-shape.

22. A passive seatbelt system according to claim 9, wherein said tape runs along a front pillar, a rocker panel and a center pillar of the vehicle.

23. A passive seatbelt system for a vehicle comprising:
a restraining seatbelt, one end of which is positioned at the center of the vehicle, the seatbelt passing across a passenger seat of the vehicle and having its other end disposed at the side of the vehicle;
a flexible non-continuous tape provided with a plurality of openings at equal intervals and a coupling recess;
a driving means for moving said tape linearly thereof in either direction, said driving means comprising a sprocket wheel which engages with said openings in said tape and a rotating means for rotating said sprocket wheel, said means comprising the sole means for applying to said tape substantial tensile force and compressive force;
a transmission means for transmitting the movement of said tape to the seatbelt by connecting said tape with the seatbelt, said transmission means enabling said tape to move said portion of said seatbelt selectively towards the front and the rear of the vehicle, said transmission means having a slider provided with a projection which engages with said coupling recess of said tape and connected with one end of the seatbelt; and
slide rail means having means defining a tape guide groove in engagement with said tape for enabling said tape to transmit tensile and compressive forces to cause said tape to move axially thereof in either direction and said slide rail means further comprising a slide guide groove extending from an upper portion of a front pillar to a rear side of the vehicle along the side of the roof on the vehicle thereby forming approximately an L-shape;
whereby a portion of the seatbelt is moved in a longitudinal direction of the vehicle to cause said seatbelt to approach or move away from a passenger.

24. A passive seatbelt system according to claim 23, wherein an inner side end of the seatbelt is retracted by a rotating mechanism.

25. A passive seatbelt system according to claim 23, wherein said rotating means comprises a motor whose direction of rotation is reversible according to opening and closing of a passenger door.

26. A passive seatbelt system according to claim 23, wherein said slide rail means extends upwardly from an upper portion of a front pillar, backwardly along the side of a roof of the vehicle thereby forming approximately a U-shape.

27. A passive seatbelt system for a vehicle comprising:
   a restraining seatbelt for a passenger;
   a flexible non-continuous tape provided with a plurality of openings at equal intervals;
   a driving means for moving said tape, having a sprocket wheel which engages with said openings in said tape and a rotating means for rotating said sprocket wheel, said means comprising the sole means for applying to said tape substantial tensile force and compressive force;
   a transmission means for transmitting the movement of said tape to the seatbelt by connecting said tape with the seatbelt, said transmission means enabling said tape to move said portion of said seatbelt selectively towards the front and the rear of the vehicle, said transmission means having a slider and a connecting means for coupling said tape with said slider, said slider receiving an intermediate portion or an end of the seatbelt to move the seatbelt in a longitudinal direction of the vehicle;
   slide rail means extending at least in part in the longitudinal direction of the vehicle and having means defining a tape guide groove in engagement with said tape for enabling said tape to transmit tensile and compressive forces to cause said tape to move axially thereof in either direction and said slide rail means further comprising a slider guide groove having said slider slidable therein;
   whereby a portion of the seatbelt is moved in a longitudinal direction of the vehicle to cause said seatbelt to approach or move away from the passenger.

* * * * *